(12) United States Patent
Shioji

(10) Patent No.: US 7,193,646 B1
(45) Date of Patent: Mar. 20, 2007

(54) DIGITAL CAMERA AND METHOD FOR CLASSIFYING AND REPRODUCING IMAGES

(75) Inventor: Masahiro Shioji, Neyagawa (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/274,771

(22) Filed: Mar. 24, 1999

(30) Foreign Application Priority Data

Mar. 25, 1998 (JP) .................................. 10-077448
Feb. 1, 1999 (JP) .................................. 11-023632

(51) Int. Cl.
H04N 5/225 (2006.01)
H04N 5/76 (2006.01)
H04N 5/222 (2006.01)
G09G 5/08 (2006.01)
G09G 5/00 (2006.01)

(52) U.S. Cl. ............................. 348/220.1; 348/231.2; 348/333.05; 345/157; 345/3.1

(58) Field of Classification Search ............ 348/220.1, 348/231.2–231.6, 207
See application file for complete search history.

(56) References Cited

U.S. PATENT DOCUMENTS 5,218,452 A 6/1993 Kondo et al.
5,576,759 A * 11/1996 Kawamura et al. .... 348/207.99
5,719,987 A 2/1998 Kawamura et al.
5,806,072 A * 9/1998 Kuba et al. ............... 348/231.2
5,899,581 A * 5/1999 Kawamura et al. ...... 348/220.1
5,986,701 A * 11/1999 Anderson et al. ........ 348/231.6
6,226,449 B1 * 5/2001 Inoue et al. ............. 348/231.4
6,249,316 B1 * 6/2001 Anderson .............. 348/333.05
6,278,447 B1 * 8/2001 Anderson .................... 345/723

FOREIGN PATENT DOCUMENTS

| JP | 5-181905 | 7/1993 |
| JP | 6-233225 | 8/1994 |
| JP | 8-140025 | 5/1996 |
| JP | 11-023632 | 1/1999 |
| KR | 97-14140 | 3/1997 |
| WO | WO 98/16058 | 4/1998 |

* cited by examiner

Primary Examiner—Tuan Ho
Assistant Examiner—Nhan Tran
(74) Attorney, Agent, or Firm—Armstrong, Kratz, Quintos, Hanson & Brooks, LLP

(57) ABSTRACT

A digital camera allowing searching of an image in a simple manner is provided, in which an image folder is formed for each session of continuous image pickup operations, and each of the plurality of images picked up in one session of continuous image pickup operation is stored as an image file in the corresponding image folder. Therefore, as compared with the conventional example in which continuously picked up images are stored in the order of pickup similar to the images picked up normally, searching of an image is facilitated. Further, as the images can be handled as an image group folder by folder, efficiency in processing can be improved.

10 Claims, 23 Drawing Sheets

THROUGH IMAGE DISPLAY

SETTING OF RECORDING CONDITION

REPRODUCED IMAGE DISPLAY

FUNCTION SELECTION

DIGITAL CAMERA AND METHOD FOR CLASSIFYING AND REPRODUCING IMAGES

BACKGROUND OF THE INVENTION

1. Field of the Invention

The present invention relates to a digital camera. More specifically, the present invention relates to a digital camera having a normal image pickup mode for taking images of an object one by one, a continuous image pickup mode for picking up images of an object continuously, a normally picked up image reproduction mode for reproducing images picked up in the normal image pickup mode, and a continuously picked up image reproduction mode for reproducing images picked up in the continuous image pickup mode.

2. Description of the Background Art

Conventionally, a digital camera has a normal image pickup mode (single still image pickup mode) for picking up still images of an object one by one, and a continuously image pickup mode for picking up still images of an object continuously at a prescribed period. The picked up images are stored in a built-in image memory in the order of pick up. In a reproduction mode, an image read from the image memory is displayed on a liquid crystal display (hereinafter referred to as an LCD). When a desired image is selected from the reproduced images and handed to a printing bureau, a print just like a photograph is obtained.

In the conventional digital camera, however, the plurality of images picked up in the continuous image pickup mode are not classified into groups session by session of continuous image pickup operations, but simply stored in the image memory in the order of image pickup as with the images picked up in the normal image pickup mode. Therefore, searching of an image has been difficult to select a desired image to be handed to the printing bureau.

In order to solve this problem, Japanese Patent Laying-Open No. 6-233225 (U.S. Pat. No. 5,719,987), for example, discloses a method of image data recording of a digital still video camera. According to the recording method, a directory for storing files of image data picked up by a digital still video camera having a plurality of image pickup modes is formed, and in the directory, only the files of images picked up by at least one image pickup mode among the plurality of image pickup modes are stored.

Though storing of image data in the directory is described in the prior art mentioned above, specific manner of transferring the image data from the directory to a personal computer, reproducing a desired image by using a browser software, moving, copying or deleting the image, or specific manner of facilitating searching of the image are not described.

SUMMARY OF THE INVENTION

Therefore, a main object of the present invention is to provide a digital camera allowing reproduction, moving, copying and deleting of image data as well as searching of images in a simple manner.

Briefly stated, the present invention provides a digital camera having a normal image pickup mode for picking up images of an object one by one, a continuous image pickup mode for picking up images of an object continuously, a normally picked up image reproduction mode for reproducing images picked up in the normal image pickup mode and a continuously picked up image reproduction mode for reproducing images picked up in the continuous image pickup mode, including a memory circuit, an image display section, first and second writing circuits, first and second selecting circuits and a first reading circuit. The memory circuit stores an image, and the image display section displays the image. The first writing circuit writes images picked up in the normal image pickup mode to the memory circuit, and second writing circuit classifies a plurality of images picked up in the continuous image pickup mode into groups session by session of continuous image pickup operations and writes the groups of images to the memory circuit. The first selecting circuit selects a desired image among the images stored in the memory circuit in the normally picked up image reproduction mode, the second selecting circuit selects a desired image group among image groups stored in the memory circuit and a desired image among the plurality of images belonging to the selected image group in the continuously picked up image reproduction mode, and the first reading circuit reads the selected image selected by the first and the second selecting circuit and applies the read image to the image display section.

Therefore, according to the present invention, searching of an image is facilitated as compared with the prior art in which a plurality of images picked up continuously are stored not classified into groups but simply in the similar manner as the normally picked up images.

In a preferred embodiment of the present invention, the second writing circuit forms reduced images of respective images and writes the reduced images together with the original respective images to the memory circuit. A third selecting circuit selects a predetermined number of reduced images from leading reduced images of respective image groups stored in the memory circuit in the continuously picked up image reproduction mode, the second reading circuits reads the predetermined number of reduced images selected by the third selecting circuit from the memory circuit, and forms an image corresponding to one image plane, to display the predetermined number of reduced images side by side at one time and applies the resulting image to the image display section. That is, the second reading circuit has the function of a so called multiple display. The second selecting circuit selects an image group by selecting a desired reduced image among the predetermined number of reduced images displayed on the image display section. As a result, selection of an image group is facilitated.

In a more preferred embodiment of the present invention, the digital camera has a continuous reproduction mode in which a plurality of images belonging to a selected image group are reproduced continuously, and a third reading circuit takes a plurality of images belonging to the image group selected by the second selecting circuit from the memory circuit and applies to the image display section continuously, in the continuous reproduction mode. This further facilitates searching of an image.

In a more preferred embodiment, the digital camera has a moving mode in which an image is moved, and a moving circuit extracts an image selected by the second selecting circuit from the image group to which the image belongs, and stores the extracted image in the same directory as an image picked up in the normal image pickup mode, in the moving mode. Therefore, in this case, an image can be easily selected when the user asks printing of the image at a printing bureau.

In a more preferred embodiment, the digital camera has a copy mode for copying an image. A copying circuit forms a copy of an image selected by the second selecting circuit in the copy mode, and stores the copied image as an image picked up in the normal image pickup mode, in the memory circuit. This facilitates selection of an image when the user goes to a printing bureau asking printing of the image.

In a preferred embodiment of the present invention, the digital camera has an image deletion mode for deleting a selected image and an image group deletion mode for deleting a selected image group. As unnecessary image group can be erased collectively, images can be deleted faster in a simple manner as compared with the prior in which unnecessary images must be deleted one by one.

According to another aspect, the present invention provides a digital camera having a normal image pickup mode in which images of an object are picked up one by one, and a continuous image pickup mode in which images of an object are picked up continuously, including a memory circuit for storing images, and a storing circuit forming directories for storing files of picked up image data in the memory circuit, storing each image picked up in the normal image pickup mode in one of the directories, and storing a plurality of images picked up in the continuous image pickup mode in another directory, with the plurality of images being classified into groups session by session of image pickup operations.

According to the present invention, the images picked up in the normal image pickup mode and the images picked up in the continuous image pickup mode are stored collectively in subdirectries within one same directory. A directory storing images picked up in the continuous image pickup mode is not in the same directory as the images picked up in the normal image pickup mode. Therefore, when an image is to be selected by using a file browser software on a personal computer, the directory storing the images picked up in the continuous image pickup mode is displayed separate from the images picked up in the normal image pickup mode. Accordingly, even when a large number of images are picked up in the normal image pickup mode, selection of an image from images picked up continuously is easy.

In a more preferred embodiment of the present invention, each image picked up in the normal image pickup mode is written to one of the directories, and a plurality of images picked up in the continuous image pickup mode are written to another directory, classified into groups session by session of image pickup operations.

Further, according to a more preferred embodiment of the present invention, an image picked up in the normal image pickup mode and an image picked up in the continuous image pickup mode which are in the same layer are reproduced and displayed.

In a more preferred embodiment, a reduced image of each image is formed and at the time of reproduction, reduced images of leading images of the plurality of image groups are displayed in multiple. By selecting a desired reduced image from the plurality of reduced images displayed in multiple, an image group is selected. This facilitates selection of an image group.

In a more preferred embodiment, the digital camera has a continuous reproduction mode in which a plurality of images belonging to the selected image group are reproduced continuously, which further facilitates searching of an image.

In a more preferred embodiment, the digital camera has a moving mode in which a desired image is extracted from an image group and stored in the same layer as an image picked up in the normal image pickup mode. This facilitates selection of an image when user asks printing of an image at a printing bureau.

Further, in a more preferred embodiment, the digital camera has a copying mode in which a copy image of a desired image of an image group is formed and the copied image is stored in the same layer as an image picked up in the normal image pickup mode. This facilitates selection of an image when the user asks printing of an image at a printing bureau.

In a more preferred embodiment, the digital camera has an image deletion mode for deleting a selected image and an image group deletion mode for deleting a selected image group. As unnecessary image group can be deleted collectively, images can be deleted faster in a simple manner as compared with the conventional method in which unnecessary images are deleted one by one.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
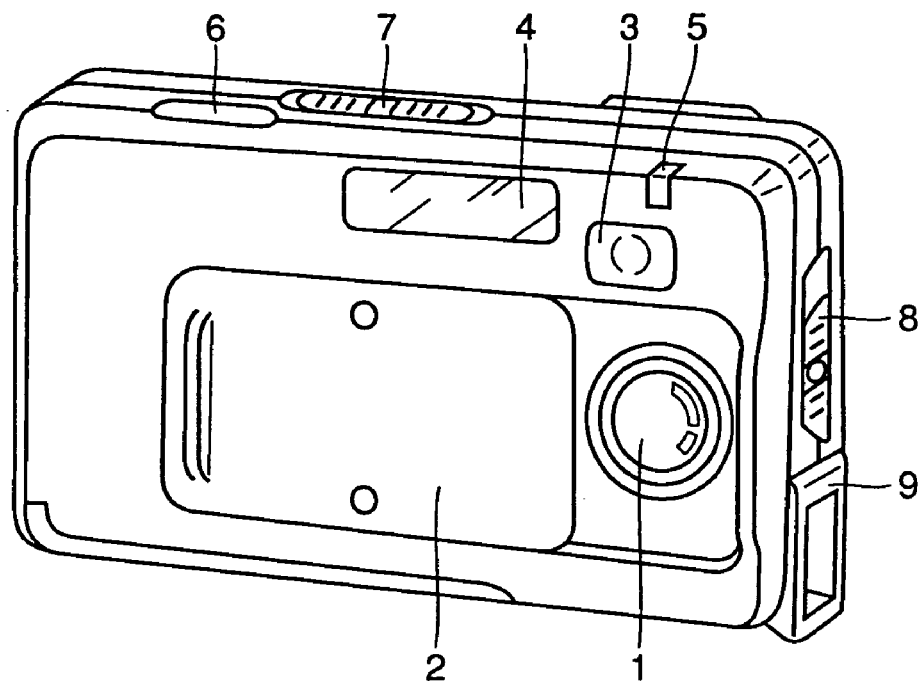
FIGS. 1A and 1B are perspective views showing appearance of a digital camera in accordance with a first embodiment of the present invention.
Figure 1B:
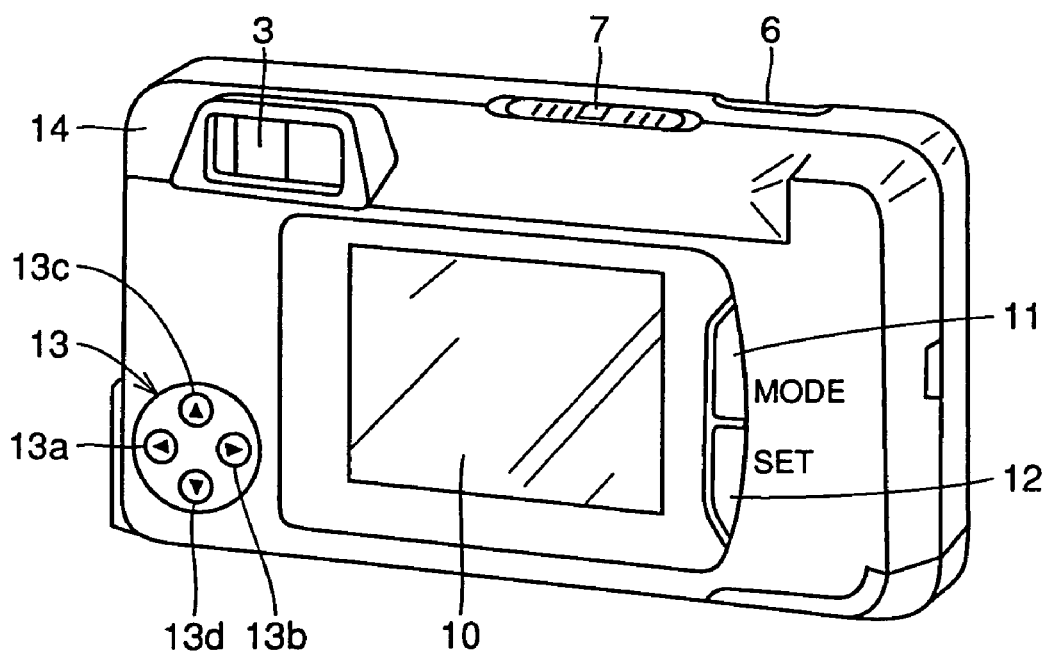

FIG. 1A is a perspective view taken from the front side (from the side of the lens) and FIG. 1B is a perspective view taken from the rear side, showing the appearance of the digital camera in accordance with the first embodiment of the present invention.

Referring to FIGS. 1A and 1B, on the front side of the digital camera, there are provided a lens 1, a lens cover 2 linked to a power switch, an optical finder 3, a flashlight 4 and an LED (Light Emitting Diode) 5 for a self timer, and on the upper and side surfaces, there are a shutter button 6, a three point type main switch 7, a macro switch lever 8 and a terminal 9. On the rear surface of the digital camera, there are provided an LCD (Liquid Crystal Display) 10, a mode button 11, a set button 12, a direction designating button 13 and a microphone 14.

Main switch 7 is used for switching among three modes, that is, an image pickup mode with LCD 10 on, an image pickup mode with LCD 10 off, and a reproduction mode. In the image pickup mode with LCD 10 on, a through image is displayed on LCD 10 and the through image is recorded. In the image pickup mode with LCD 10 off, image is picked up using optical finder 3 in the similar manner as the conventional camera using silver film. In the reproduction mode, LCD 10 is turned on and a reproduced image is displayed on LCD 10. On LCD 10, in addition to the through image and the reproduced image, various icons (characters) representing recording condition, reproduction function and so on are also displayed.

By pressing lightly each of left, right, up and down direction designating sections 13a, 13b, 13c and 13d of direction designating button 13, feeding/reversing of the reproduced image, setting of recording condition, selection of reproduction function and so on can be set.

Figure 2:
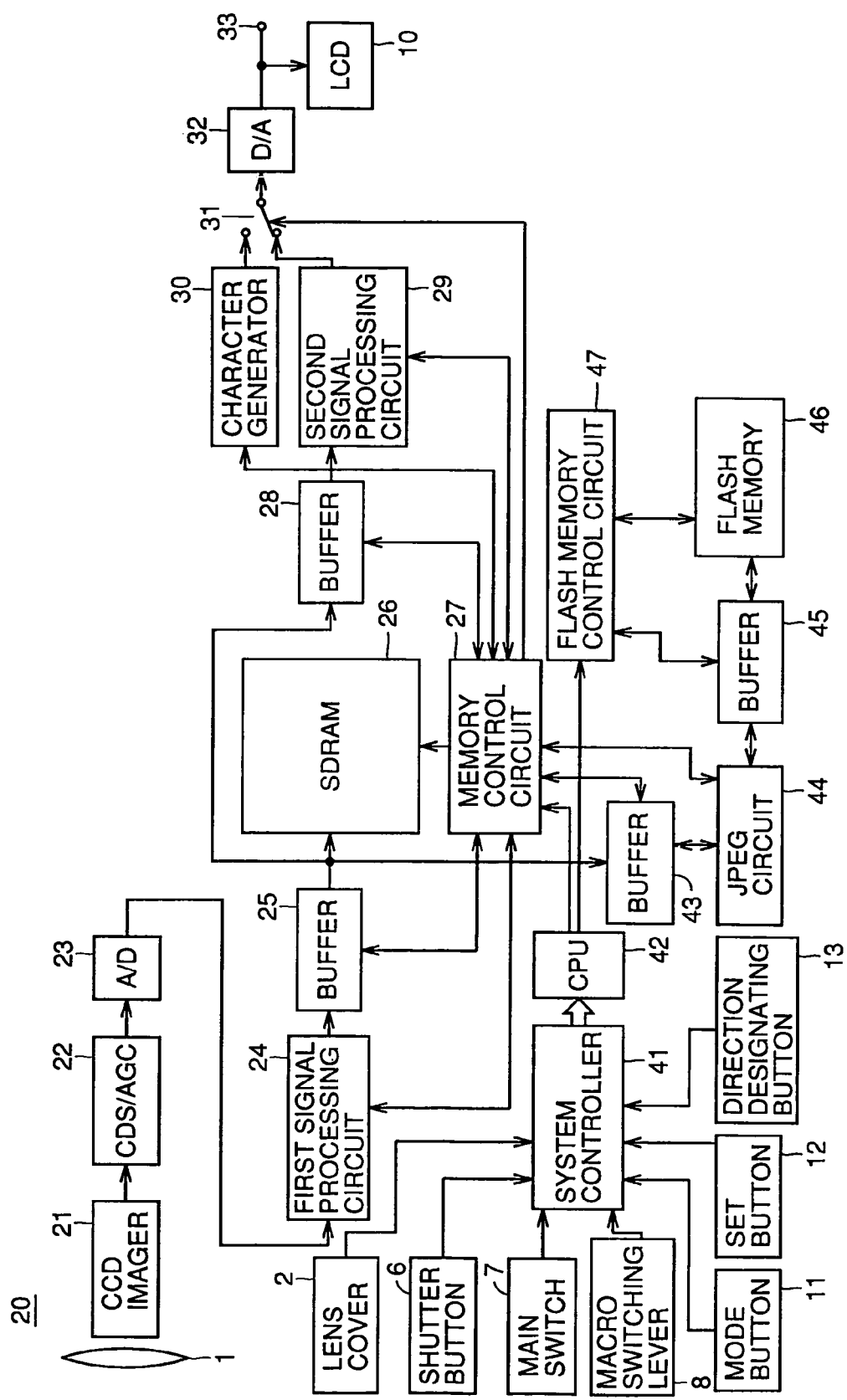
FIG. 2 is a block diagram showing a configuration of an image recording and reproducing circuit contained in the digital camera shown in FIGS. 1A and 1B.

FIG. 2 is a block diagram representing a configuration of an image recording and reproducing circuit 20 contained in the digital camera.

Referring to FIG. 2, in image recording and reproducing circuit 20, a system controller 41 applies various control signals to a CPU (Central Processing Unit) 42 at prescribed timings, in response to signals from lens cover 2, shutter button 6, main switch 7, macro switch lever 8, mode button 11, set button 12 and direction designating button 13. In accordance with the control signals applied from system controller 41, CPU 42 controls a memory control circuit 27 and a flash memory control circuit 47.

Memory control circuit 27 controls a first signal processing circuit 24, a second signal processing circuit 29, a JPEG (Joint Photographic Expert Group) circuit 44, buffers 25, 28, 43 and an SDRAM (Synchronous Dynamic random Access Memory) 26. Write/read of image data to and from SDRAM 26 are performed through buffers 25, 28 and 43. As the speed of transfer between buffers 25, 28 and 43 and SDRAM 26 (write/read) is made faster than the speed of data transfer among buffers 25, 28, 43, the first signal processing circuit 24, the second signal processing circuit 29 and JPEG circuit 44, the circuit 24, 29 and 44 can operate almost simultaneously.

Memory control circuit 27 controls a character generator 30 and a switch 31 so that a part of image data is replaced with a character image data, whereby a character image is overwritten on the through image or the reproduced image.

Flash memory control circuit 47 controls buffer 45 and a flash memory 46, writes image data compressed by JPEG circuit 44 to flash memory 46 through buffer 45, and applies data read from flash memory 46 to JPEG circuit 44 through buffer 45.

In the image pickup mode, an optical image entering through lens 1 is incident on a CCD (Charge Coupled Device) imager 21 through a complementary color filter, not shown. CCD imager 21 outputs electric signals (progressive scan signals) of pixels in accordance with progressive scanning (progressive scanning of pixels). The progressive scan signals from CCD imager 21 are applied to a CDS/AGC circuit 22.

CDS/AGC circuit 22 performs known noise removal and level adjustment on the progressive scan signals, and the progressive scan signals which have been subjected to such processings are converted to digital data (image data) by A/D converter 23. First signal processing circuit 24 performs known white balance adjustment and gamma correction on the image data output from A/D converter 23, and thereafter, applies the Memory control circuit 27 writes the image data to SDRAM 26, and thereafter reads the image data by interlace scanning. Therefore, odd-numbered field image data and even-numbered field image data are output alternately from SDRAM 26. The image data output from SDRAM 26 are input to second signal processing circuit 29 through buffer 28 and to JPEG circuit 44 through buffer 43.

Figure 3A:
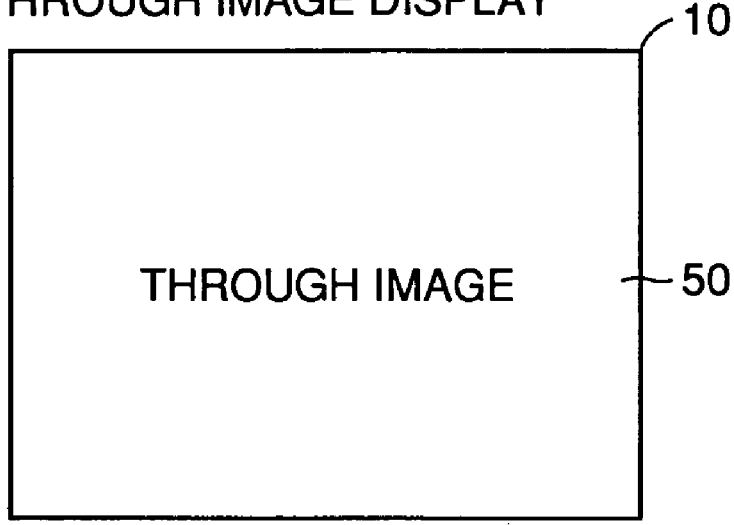
FIGS. 3A and 3B are illustrations representing image pickup modes of the digital camera shown in FIGS. 1A and 1B.

The second signal processing circuit 29 performs processing such as color interpolation on the input image data, and image data output from second signal processing circuit 29 are applied to D/A converter 32 through switch 31. D/A converter 32 converts the image data to analog signals (image signals), which image signals are output through an output terminal 33 and applied to LCD 10. Therefore, real time motion image (through image) 48 is displayed on LCD 10, as shown in FIG. 3A.

Figure 3B:
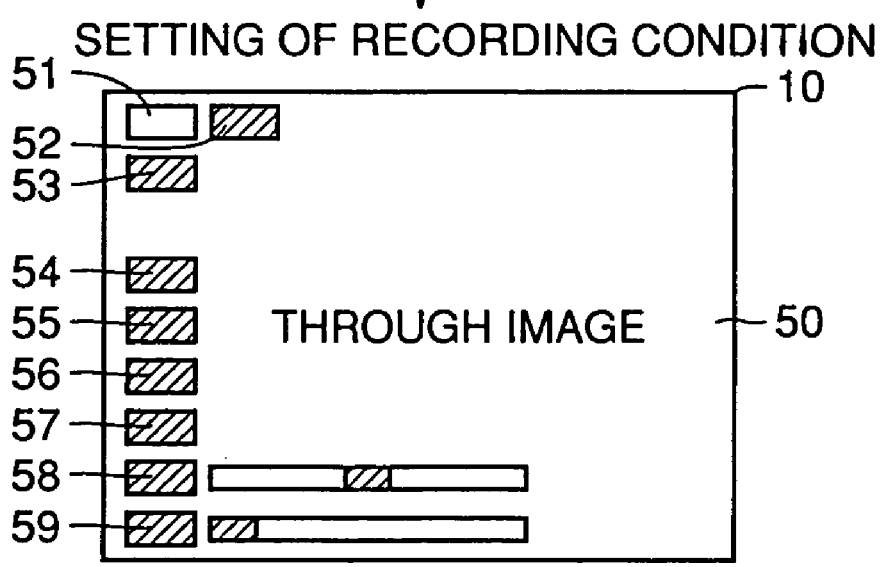

When mode button 11 is pressed in this state, various icons 50 to 59 indicating the recording condition are displayed on an end portion of LCD 10. In FIG. 3B, the icons are represented as a simple white rectangle and hatched rectangles, for simplicity of the drawing. Actually, the icons are marks representing corresponding recording conditions. Icons 50 to 59 are for setting a normal single still image pickup mode, continuous image pickup mode, motion image pickup mode, resolution, voice memo, self timer, macro mode display, exposure correction and digital zooming.

Icons 50 to 59 are selected by direction designating button 13. Among icons 50 to 59, the selected icon (in the figure, icon 50) is displayed in a positive state (white rectangle) and other icons are displayed in a negative state (hatched rectangles). When set button 12 is pressed in this state, the condition represented by the selected icon (in this case, icon 50) is set (in this case, still image pickup mode). When mode button 11 is pressed after the setting of recording conditions, icons 50 to 59 disappear and the display returns to the state of FIG. 3A.

When an operator presses a shutter button 6, JPEG circuit 44 is activated, image data read from SDRAM 26 and input to JPEG circuit 44 through buffer 43 are compressed in accordance with a JPEG format, and the compressed data is written to flash memory 46 through buffer 45.

In the continuous image pickup mode, fifteen (15) still images are continuously picked up at the rate of 10 images/sec. In the motion image pickup mode, a motion image is picked up for 5 sec, at the rate of 10 frames/sec.

Memory control circuit 27 thins out images temporarily displayed on buffer 43 to generate reduced images (thumb nail images) for multiple reproduction, which reduce images are to be displayed on 9 windows on the screen. In the normal single still image pickup mode and in the continuous image pickup mode, a reduced image is formed for each still image. In the motion image pickup mode, a reduced image is formed for the still image of the first frame only, for each session of motion image pickup. The reduced image data are written as index data of the corresponding image data, in flash memory 46.

In a reproduction mode, the compressed data read from flash memory 46 is input to JPEG circuit 44 through buffer 45. JPEG circuit 44 decompresses the input compressed data and applies the data to SDRAM 26 through buffer 43. Memory control circuit 27 writes the image data to SDRAM 26, and thereafter, reads the image data by interlace scanning.

Figure 4A:
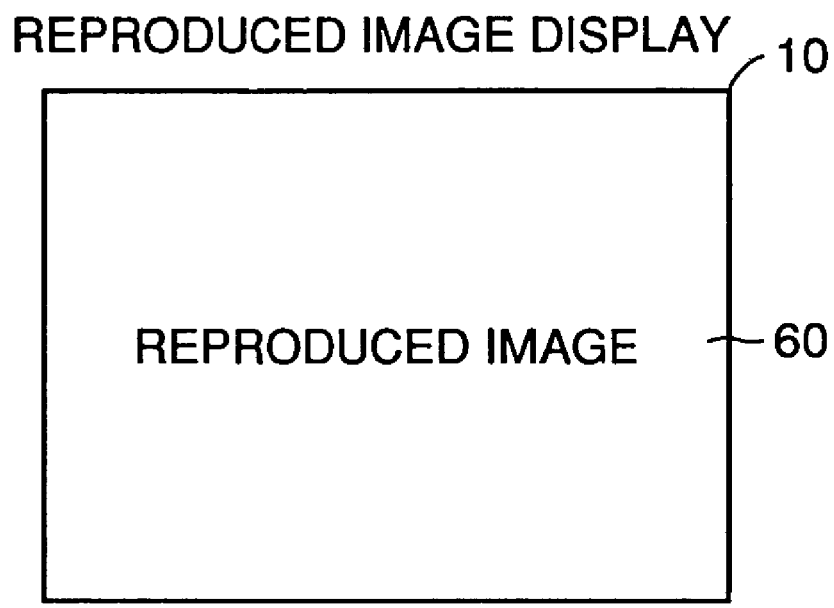
FIGS. 4A and 4B are illustrations showing reproduction modes of the digital camera shown in FIGS. 1A and 1B.

The image data read from SDRAM 26 are applied through buffer 28, second signal processing circuit 29 and switch 31 to D/A converter 32 and converted to analog image signals. The analog image signals are output to the outside through output terminal 33 and to LCD 10. Thus as shown in FIG. 4A, reproduced image 60 is displayed on LCD 10. When left direction designating section 13*a* of direction designating button 13 is pressed, an image recorded prior to the reproduced image is reproduced, and when the light direction designating section 13*b* is pressed, an image recorded after the reproduced image is reproduced. In this manner, a desired image can be selected and reproduced.

Figure 4B:
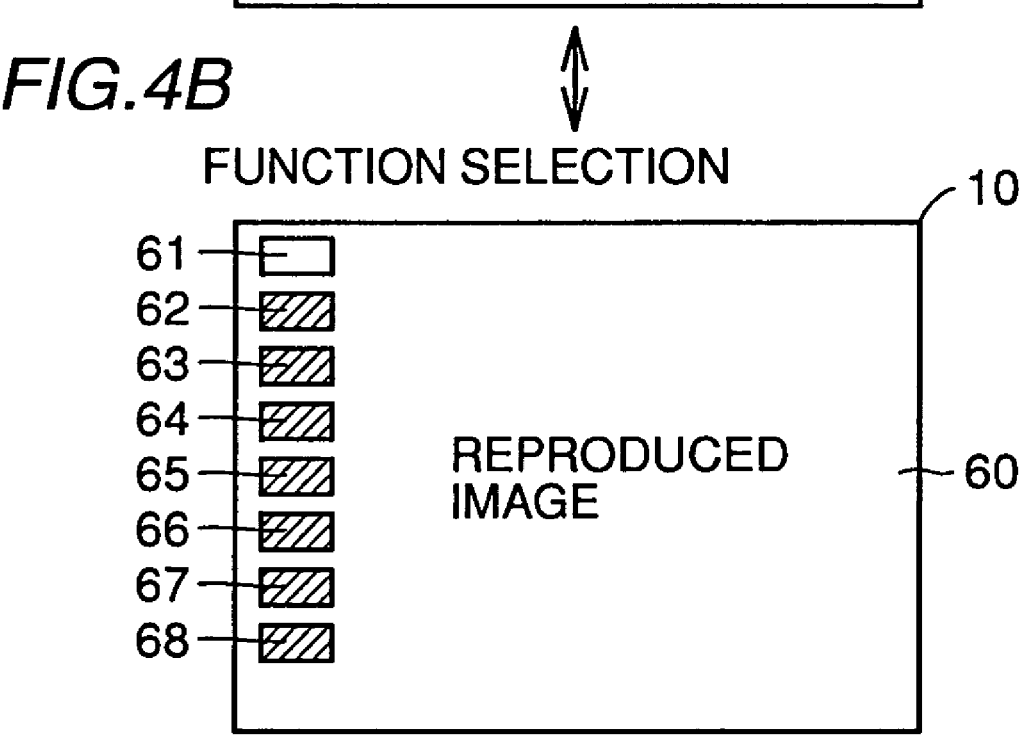
Figure 5:
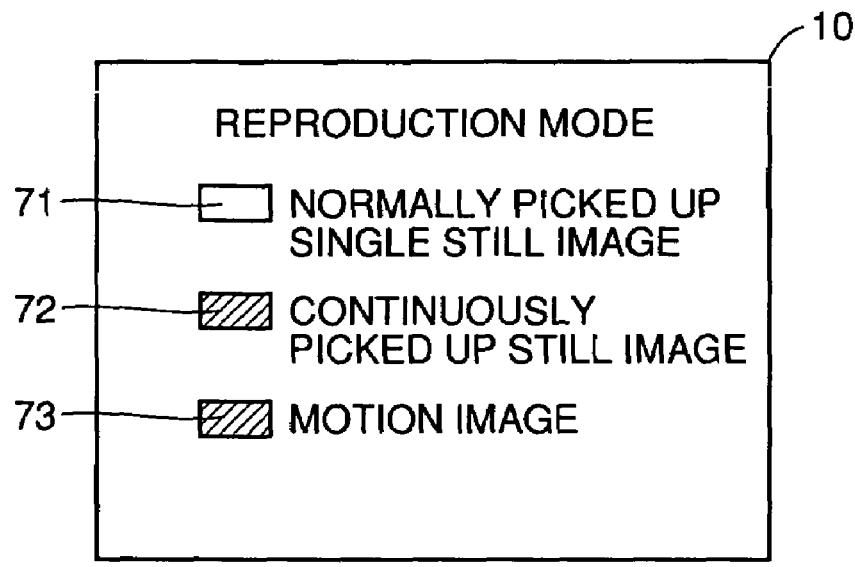
FIG. 5 is another illustration related to the reproduction mode of the digital camera shown in FIGS. 1A and 1B.

When mode button 11 is pressed in this state, various icons 61 to 68 representing reproducing functions are displayed on an end portion of LCD 10 as shown in FIG. 4B. Icons 61 to 68 are for selecting reproduction mode, multi-reproduction, reproduction zooming, protection, deletion, edition, card operation and setting of date and time, respectively. A desired one of icons 61 to 68 is selected by direction designating button 13 and when set button 12 is pressed, the function represented by the icon is selected. When mode button 11 is pressed without pressing set button 12, the display returns to the state of FIG. 4A.

When icon 61 for selecting reproduction mode is selected in the state of FIG. 4B and the mode is set, characters and an icon 71 representing normally picked up single still image reproduction mode, characters and an icon 72 representing continuously picked up still image reproduction mode, and characters and an icon 73 representing a motion image reproduction mode are displayed on LCD 10. By selecting and setting any of the three reproduction modes by direction designating button 13 and set button 12, an operation in the set reproduction mode is executed.

Figure 6:
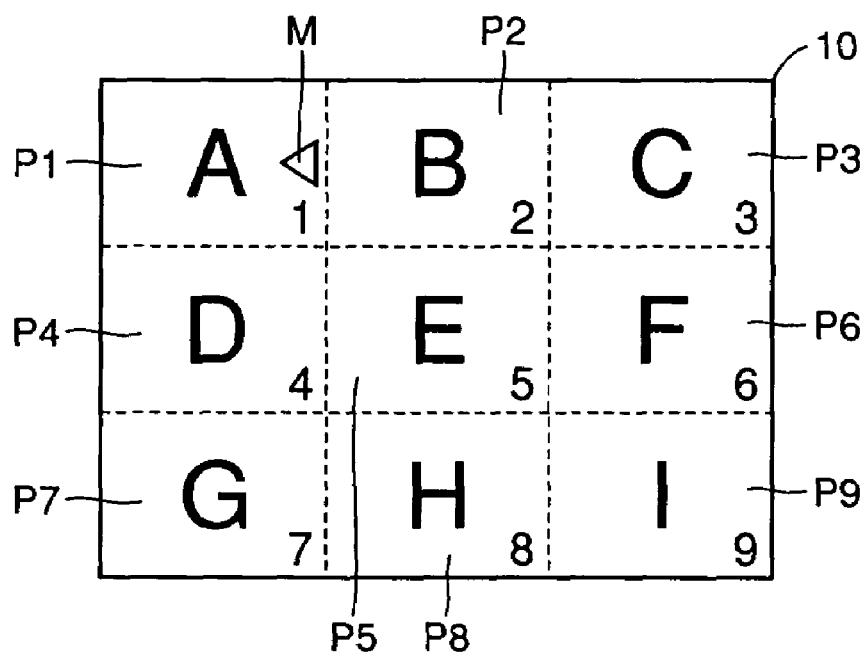
FIG. 6 is an illustration representing a multiple reproduction mode of the digital camera shown in FIGS. 1A and 1B.
Figure 7:
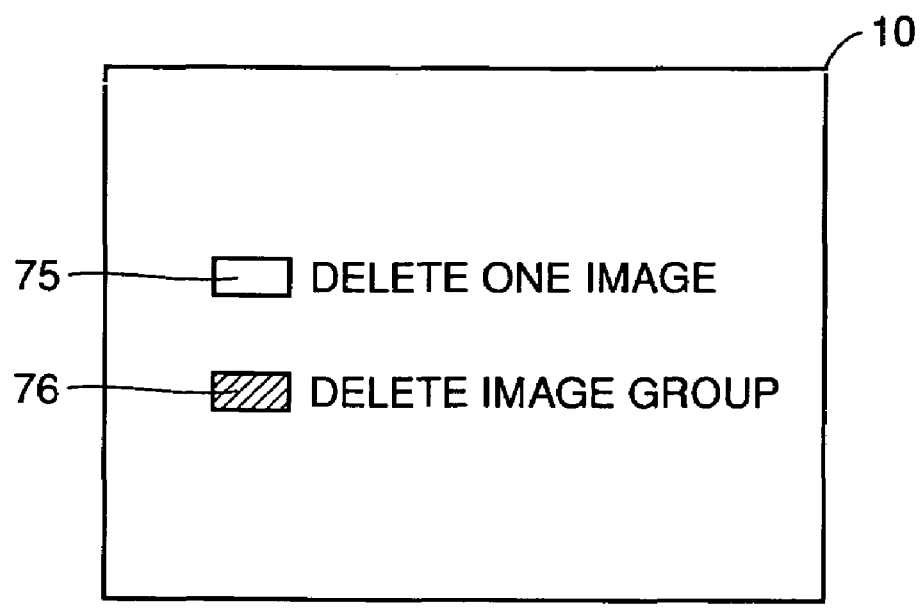
FIG. 7 is an illustration related to a deletion mode of the digital camera shown in FIGS. 1A and 1B.
Figure 8:
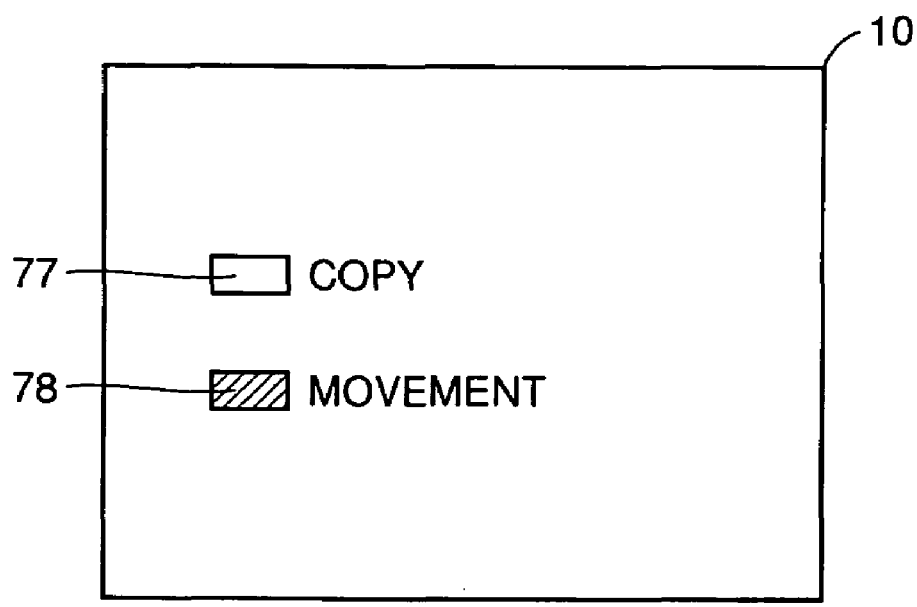
FIG. 8 is an illustration related to a copy mode and a moving mode of the digital camera shown in FIGS. 1A and 1B.

When icon 62 for multiple reproduction is selected and set in the state of FIG. 4B, nine reduced images P1 to P9 are displayed as shown in FIG. 6. The contents of reduced images P1 to P9 are represented by characters A to I in FIG. 6, for the simplicity of drawings. At lower right corner of each of the reduced images P1 to P9, respective image numbers 1 to 9 are displayed. A selection mark M is displayed on any of the reduced images P1 to P9 (in the shown example, P1).

It is possible to move the selection mark M to each reduced image by operating direction designating button 13. When selection mark M is moved outside the display area (for example, right side of reduced image P9), only one row of reduced images are left, and two rows of reduced images are newly displayed. When the selection mark M is positioned on a desired reduced image and set button 12 is pressed, the reduced image is displayed in full size on the full LCD 10.

At this time, in the circuit of FIG. 2, reduced image data of nine images are read continuously from flash memory 46, and written to SDRAM 26 through buffer 45, JPEG circuit 44 and buffer 43. Memory control circuit 27 reads image data of nine images written to SDRAM 26 so that nine reduced images P1 to P9 form a still image of one image plane. Thus nine reduced images P1 to P9 are displayed on LCD 10. When one of the nine reduced images P1 to P9 displayed on LCD 10 is selected, the normal still image corresponding to the reduced image is read from the flash memory 46, and the still image is displayed on the full screen of LCD 10.

In the normally picked up single still image reproduction mode, multiple reproduction display is given only when the multiple reproduction mode is selected and set. In the continuously picked up still image reproduction mode and in the motion image reproduction mode, reduced images of representative images of each image group are reproduced and displayed in multiple, simply when each mode is selected and set, even when the multireproduction mode is not selected. Here, the image group refers to a series of images picked up in one session of image pickup operation in the continuous image picked up mode or the motion image pickup mode.

When the icon 65 for deletion is selected in the state of FIG. 4B, characters and an icon 75 representing deletion of one image, and characters and an icon 76 representing deletion of an image group are displayed on the LCD 10. When icon 75 is selected, deletion of the still image displayed on LCD 10 becomes possible. When icon 76 is selected, it is possible to delete the whole image group including images displayed on LCD 10.

When icon 67 for card operation is selected and set in the state of FIG. 4B, characters and an icon 77 representing copying of an image, and characters and an icon 78 representing movement of an image are displayed on LCD 10. When icon 77 is selected and set, the image displayed on LCD 10 among an image group can be recorded as an image picked up in the normal single still image pickup mode. When icon 78 is selected and set, the image displayed on LCD 10 among the image group can be recorded as an image picked up in the normal single still image pickup mode, and original image can be deleted.

Figure 9:
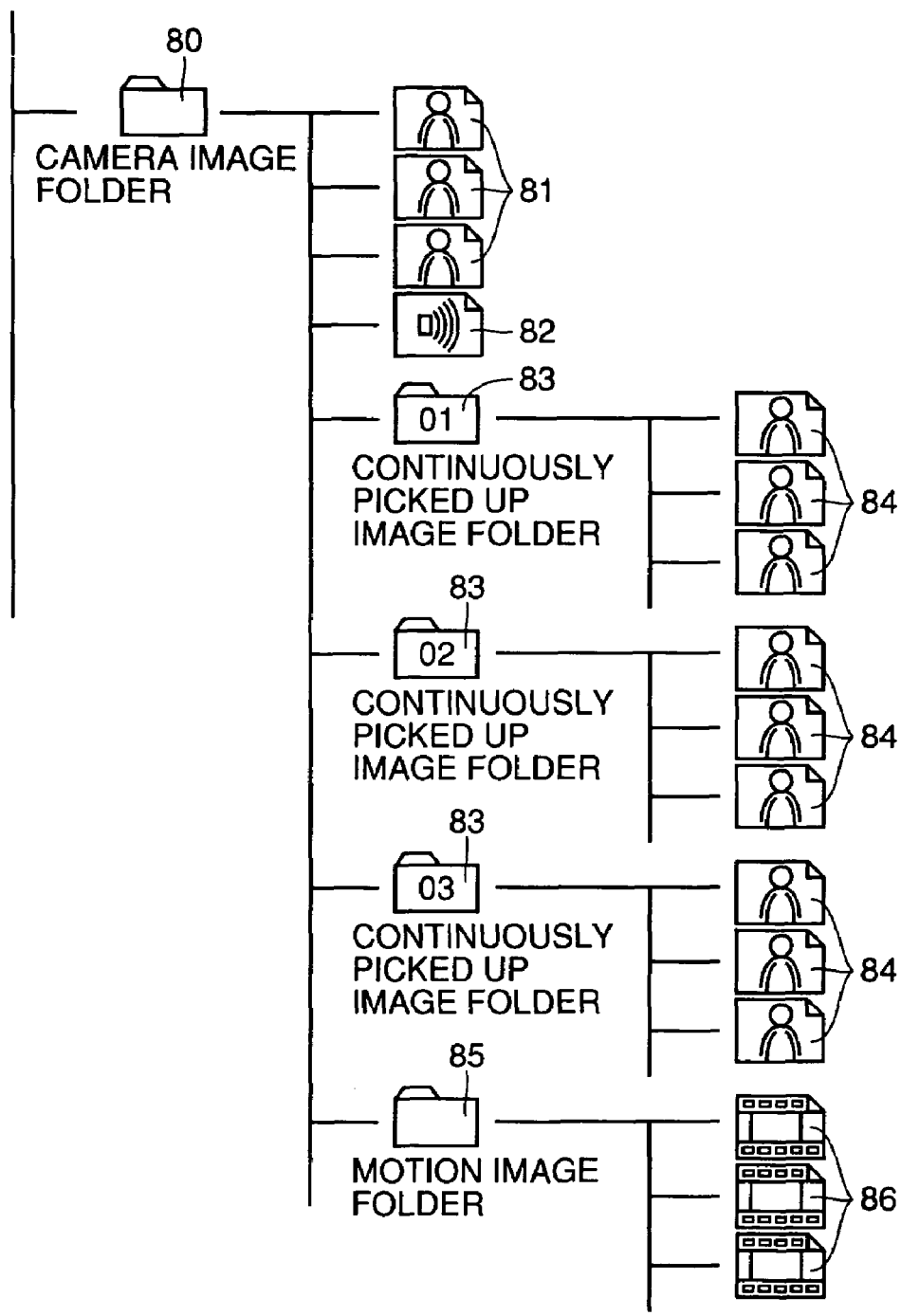
FIG. 9 is an illustration representing a method of file management of the digital camera shown in FIGS. 1A and 1B.

A file management method of the digital camera will be described in the following. Referring to FIG. 9, in the digital camera, a camera image folder 80 and the motion image folder 85 are formed in a memory area of flash memory 46, and the motion image folder 85 is stored in camera image folder 80.

In the normal single still image pickup mode, the image data of the picked up still image is stored as an image file 81 in camera image folder 80. The image data of a reduced image of the still image serves as an index of the corresponding image file 81. Voice data input through microphone 14 in a voice memo mode is stored in camera image folder 80 as voice file 82.

In the continuous image pickup mode, a continuously picked up image folder 83 is formed for each session of continuous image pickup, and the plurality of still images picked up in one session of continuous image pickup are stored in the corresponding folder 83, as image files 84. Reduced image data of each still image serves as an index of the corresponding image file 84. The continuously picked up image folder 83 is stored together with the image file 81 formed in the normal still image pickup mode, in camera image folder 80.

In the motion image pickup mode, images of a plurality of frames picked up in one session of motion image pickup are stored in the motion image folder 85 as motion image files 86. Of the images of the plurality of frames included in each motion image file 86, image data of a reduced image of the first frame image serves as an index of the corresponding motion image file 86.

Figure 10:
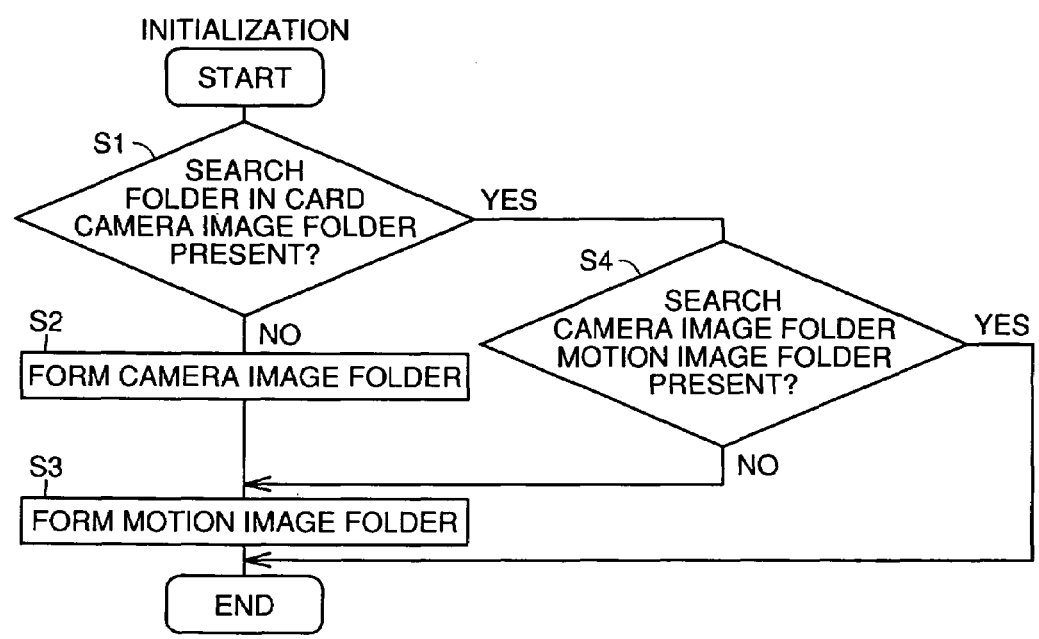
FIG. 10 is a flow chart representing a method of initialization of the digital camera shown in FIGS. 1A and 1B.

In the following, the method of file management will be described in detail with reference to the flow charts. FIG. 10 is a flow chart representing a method of initializing flash memory (card) 46. Referring to FIG. 46, CPU 42 searches card 46 in step 41 to determine whether there is a camera image folder 80. When there is no camera image folder 80, CPU 42 forms a camera image folder 80 in step S2, and forms a motion image folder 85 in camera image folder 80 in step S3, and thus initialization ends.

When there is camera image folder 80 in step S1, whether there is a motion image folder 85 in camera image folder 80 is determined in step S4. When there is no motion image folder 85, the flow proceeds to step S3, and when there is motion image folder 85, initialization ends.

Figure 11:
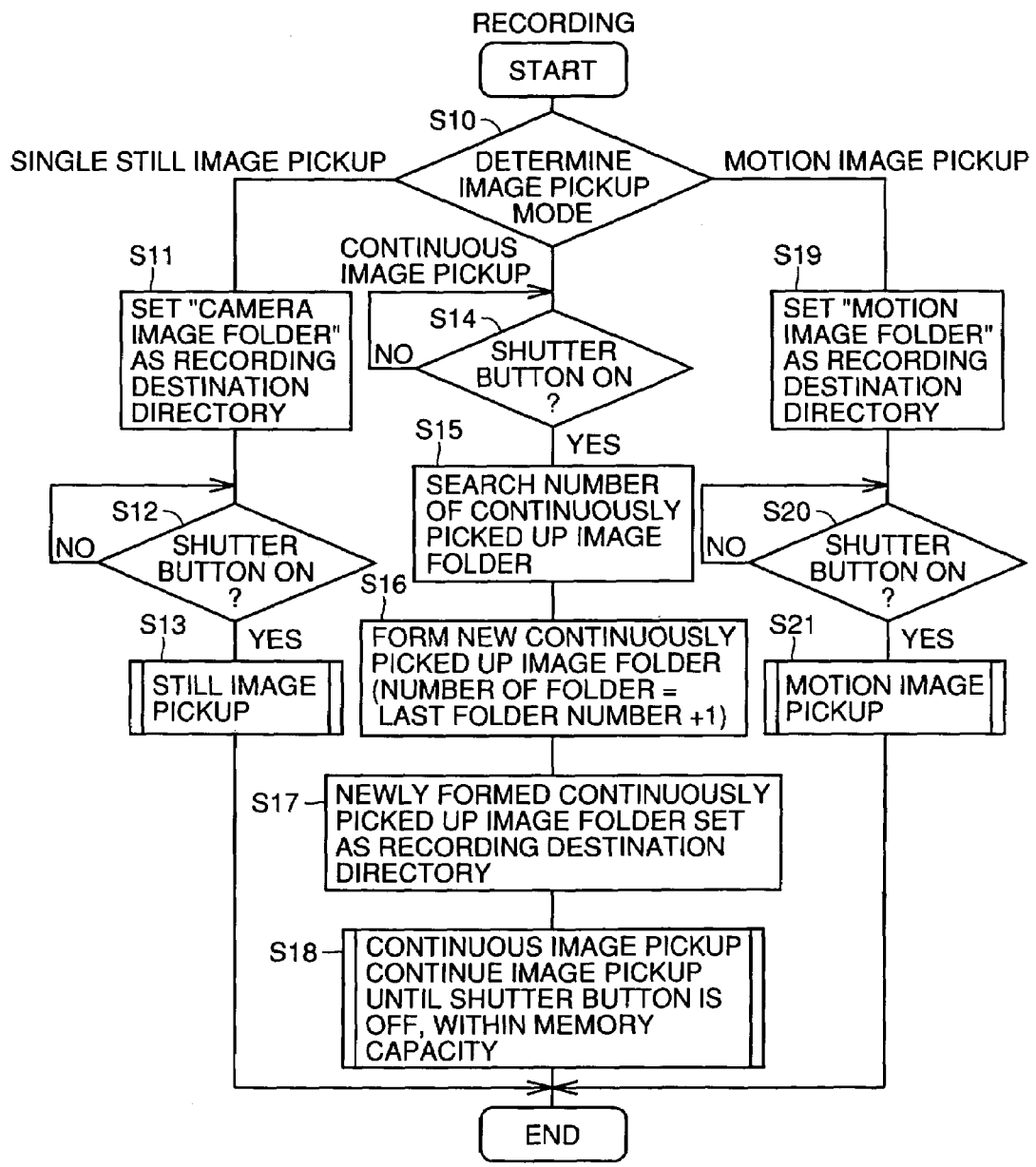
FIG. 11 is a flow chart representing a method of recording of the digital camera shown in FIGS. 1A and 1B.

FIG. 11 is a flow chart representing a method of recording. Referring to FIG. 11, CPU 42 determines in step S10 to which of normal single still image pickup mode, continuous image pickup mode and motion image pickup mode, the pickup mode is set.

When the normal single still image pickup mode is set, CPU 42 sets a recording destination directory in camera image folder 80 in step S11 and waits for pressing of shutter button 6 in step S12. When shutter button 6 is pressed, CPU 42 picks up a still image in step S13 and ends recording. The data of the still image picked up at this time are stored in camera image folder 80 as image file 81.

When the continuous image pickup mode is set, CPU 42 waits for pressing of shutter button 6 in step S14. When the shutter button 6 is pressed, CPU 42 searches a continuous folder number in step S15, and forms a new continuously picked up image folder 83 of which number is the number of last folder number +1, in step S16. Thereafter, CPU 42 sets the newly formed continuously picked up image folder 83 as a recording destination directory in step S17, picks up images continuously in step S18, and recording ends. At this time, continuous image pickup continuous until the shutter button 6 is off, within the memory capacity. Image data of the plurality of still images picked up continuously are stored as a plurality of image files 84 in the newly formed continuously picked up image folder 83.

When the motion image pickup mode is set, CPU 42 sets the recording destination directory in motion image folder 85 in step S19, waits for pressing of shutter button 6 in step S20, and when shutter button 6 is pressed, performs motion image pickup in step S21. At this time, images of a plurality of frames picked up at this time are stored as motion image file 86 in motion image folder 85.

FIGS. 12 to 15 are flow charts representing an operation in the reproduction mode. In step S30, CPU 42 determines which of normally picked up single still image reproduction mode, continuously picked up still image reproduction mode and motion image reproduction mode is set as the reproduction mode. When the normally picked up single still image reproduction mode is set, CPU 42 sets camera image folder 80 in a reproduction object directory in step S31, and in step S32, searches the still image file 81. Thereafter, CPU 42 selects a still image file 81 in accordance with an instruction from the operator in step S33, and reproduces the selected still image in step S34. At this time, when direction designating section 13b or 13b of direction designating button 13 is kept pressed for a prescribed time period (for example, for 2 seconds), it is possible to continuously reproduce a plurality of still images held in camera image folder 80 in the order of pick up or reverse order.

Thereafter, in step S35, CPU 42 determines whether it is necessary to reproduce another file 81. If it is necessary, the flow returns to step S33, and otherwise, the flow proceeds to step S36. Thereafter, in step S36, CPU branches to different function and performs different function, and in step S37, it is determined whether it should exit from the normally picked up single still image reproduction mode. If not, the flow returns to step S32, and if it should exit the mode, the flow proceeds to step S38. Thereafter, in step S38, CPU 42 determines whether the reproduction mode should be terminated. If it should be terminated, the reproduction mode ends, and if not, the flow returns to step S30.

Figure 13:
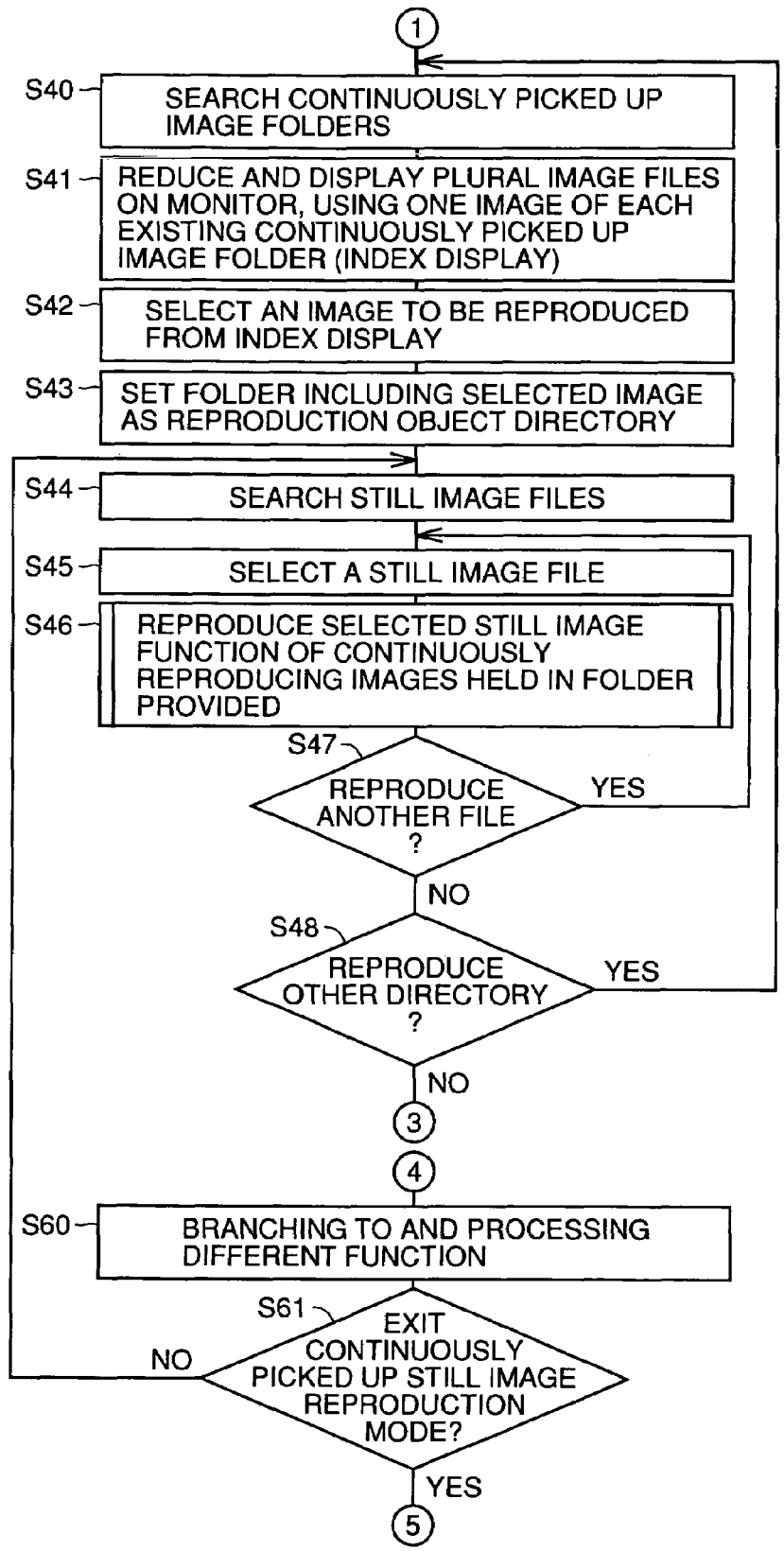
FIG. 13 represents a part related to a continuously picked up still image reproduction mode, of the flow chart representing the reproduction mode of the digital camera shown in FIGS. 1A and 1B.

When the continuously picked up still image reproduction mode is set, CPU 42 searches continuously picked up image folders 83 in step S40 of FIG. 13, and provides multireproduction display (index display) of a plurality of reduced images on LCD 10, using reduced image data of leading images of respective continuously picked up image folders 83 in step S41.

Thereafter, CPU 42 selects an image to be reproduced among a plurality of reduced images displayed as indexes in accordance with an instruction from the operator in step S42, and in step S43, sets that continuously picked up image folder 83 which includes the selected image in the reproduction object directory.

Thereafter, CPU 42 searches still image files 84 in step S44, selects a still image file 84 in accordance with an instruction of the operator in step S45, and reproduces the selected still image in step S46. At this time, when direction designating section 13b or 13a of direction designating button 13 is kept pressed for a prescribed time period (for example, 2 seconds), it is possible to continuously reproduce the plurality of still images held in continuously picked up image folder 83 in the order of pickup or the reverse order.

Thereafter, in step S47, CPU 42 determines whether another file 84 is to be reproduced or not. If the file should be reproduced, the flow returns to step S45, and if not, the flow proceeds to step S48. Thereafter, CPU 42 determines whether another directory is to be reproduced or not in step S48. If the directory should be reproduced, the flow returns to step S40, and if not, the flow proceeds to step S49 of FIG. 14 in which whether the image file 84 is to be moved or not. If the image file is not to be moved, whether the image should be deleted or not is determined in step S50. If the image should not be deleted, whether folder 83 should be deleted or not is determined in step S51, and if the folder should not be deleted, the flow proceeds to step S60 of FIG. 13.

When it is determined that image file 84 is to be moved in step S49, CPU 42 determines whether the file should be copied or moved in step S52. If the file is to be copied, a copy of the file 84 of the image which is being displayed is formed in a specific holder 85 in step S53 and the flow proceeds to step S60. When the file should be moved, the file 84 of the image which is being displayed is moved to the specific folder 85 in step S54, and the flow proceeds to step S56.

If it is determined in step S50 that the image is to be deleted, CPU 42 deletes the file 84 of the image which is being displayed in step S55, searches folder 83 to determine whether there is file 84 in step S56, and if there is, the flow proceeds to step S60. If not, a reproduction object folder 83 is deleted in step S57. Thereafter, CPU 42 sets a reproduction object folder 83 newly in step S58, and proceeds to step S60 of FIG. 13. When it is determined that the folder should be deleted in step S51, the reproduction object folder 83 containing the image which is being displayed is deleted in step S59, and the flow proceeds to step S58.

Returning to FIG. 13, CPU 42 branches to different function and performs the different function in steps S60. Whether the operation should exit the continuously picked up still image reproduction mode or not is determined in step S61. If the operation should not exit this reproduction mode, the flow returns to step S44, and if the operation should exit, the flow proceeds to step S38 of FIG. 12.

Figure 15:
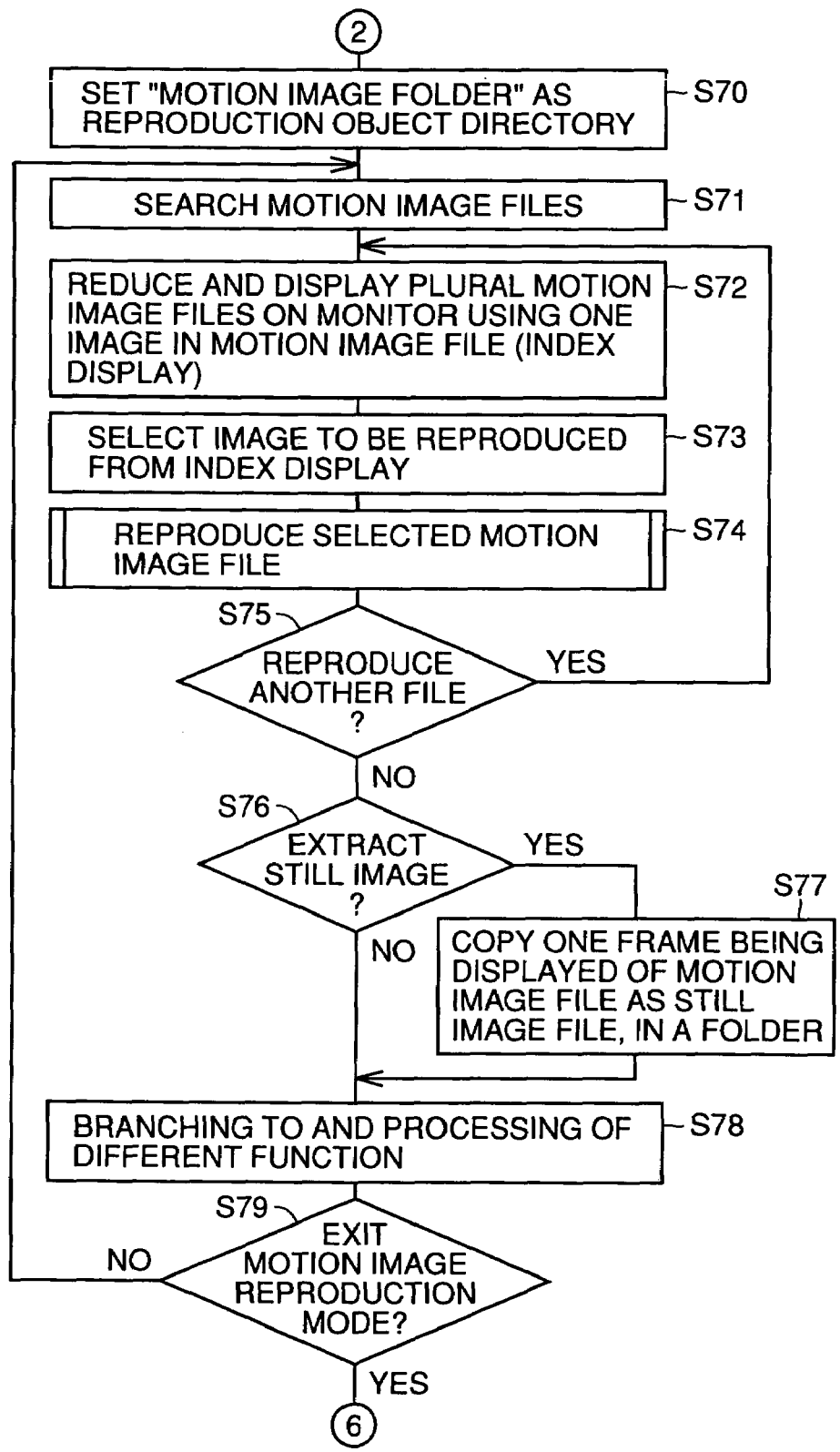
FIG. 15 represents a part related to a motion image reproduction mode of the flow chart representing the reproduction mode of the digital camera shown in FIGS. 1A and 1B.
Figure 16:
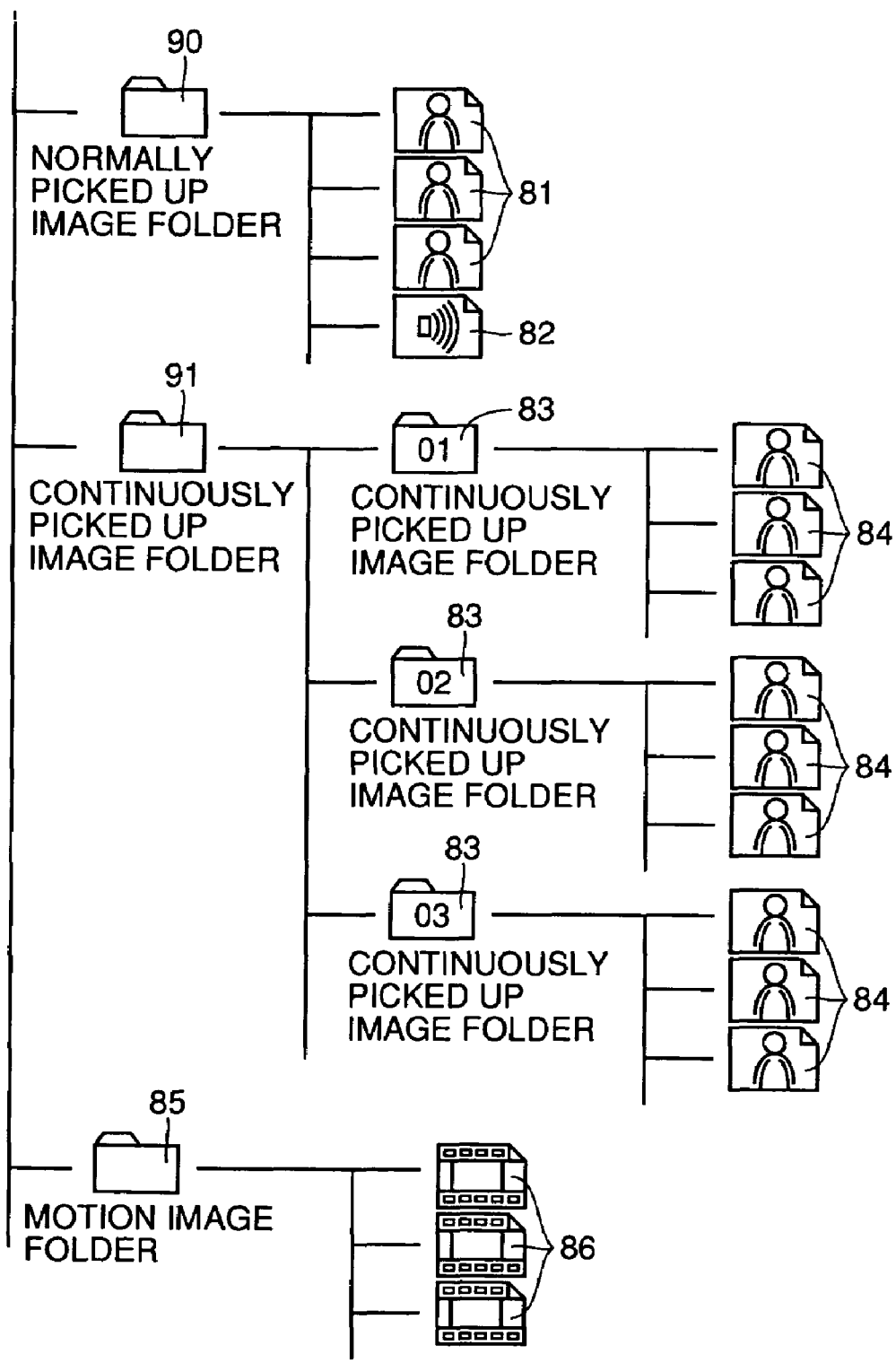
FIG. 16 is an illustration representing an improvement of the method of file management shown in FIG. 9.

When the motion image reproduction mode is set, CPU 42 sets the motion image folder 85 as the reproduction object directory in step S70 of FIG. 15, searches motion image file 86 in step S71, and in step S72, provides index display of a plurality of reduced images on LCD 10, using reduced images as indexes of respective motion image file 86.

Thereafter, CPU 42 selects an image to be reproduced among a plurality of reduced images displayed as indexes in accordance with an instruction from the operator in step S73, and reproduces the selected image in step S74. At this time, by operating direction designating button 13, it is possible to feed/reverse a plurality of images contained in the motion image file 86 including the selected image, one frame by one frame. Further, when direction setting section 13b or 13a of direction designating button 13 is kept pressed for a prescribed time period (for example, 2 seconds), it is possible to continuously reproduce the plurality of images included in the motion image file 86 in the order of pickup or in the reverse order.

Thereafter, CPU 42 determines whether another motion image file 86 is to be reproduced or not in step S75. If another motion image file is to be reproduced, the flow returns to step S72, and if not, the flow proceeds to step S76. Thereafter, CPU 42 determines whether a still image is to be extracted from motion image file 86 or not in step S76. If a still image should not be extracted, the flow proceeds to step S78, and if a still image is to be extracted, the image of one frame which is being displayed at present of motion image file 86 is copied as a still image file 81, to camera image folder 80 in step S77.

Thereafter, CPU 42 branches to different function and performs the different function in step S78, whether the operation should exit the motion image reproduction mode or not is determined in step S79. If the operation should not exit the motion image reproduction mode, the flow returns to step S71, and if the operation should exit, the flow proceeds to step S38 of FIG. 12.

In the present embodiment, a plurality of still images picked up continuously are classified into groups session by session of image pickup operations, a reduced image of each still image is formed, and in the continuously picked up image reproduction mode, reduced images of respective image groups are reproduced in multiple and displayed. By selecting one of the multiple reproduced and displayed plurality of reduced images, an image group can be selected. Therefore, as compared with the prior art in which a plurality of continuously picked up still images are not classified into groups but stored in the order of image pickup as with the still images picked up in the normal single still image pickup mode, searching of an image is facilitated.

Further, as continuous reproduction (slide show reproduction) by the unit of image group can be done in a simple manner, it is possible to search an image within an image group quickly in a simple manner.

Further, it is possible to extract a desired image file 84 from each image group and store the file together with the image file 81 picked up in the normal single still image pickup mode. Therefore, an image can be readily selected when the user asks printing at a printing bureau. Further, it is possible to collect desired images only and reproduce the collected images continuously. Further, it is possible to extract only a desired image file 84 from each image group and collectively delete unnecessary files 84 and folder 83. Therefore, as compared with the prior art in which it was necessary to delete image files one by one, unnecessary image files can be deleted quickly in a simple manner.

In the present embodiment, all files 81, 82, 84 and 86 are stored in one camera image folder 80. However, the manner of storing is not limited thereto. For example, a normally picked up image folder 90, a continuously picked up image folder 91 and a motion image folder 85 may be formed in flash memory 46, image file and voice file 82 obtained through normal image pickup may be stored in the normally picked up image folder 90, continuously picked up image folders 83 and image files 84 obtained by continuous image pickup may be stored in the continuously picked up image folder 91, and motion image files 86 obtained by the motion image pickup may be stored in the motion image folder 85.

Figure 17:
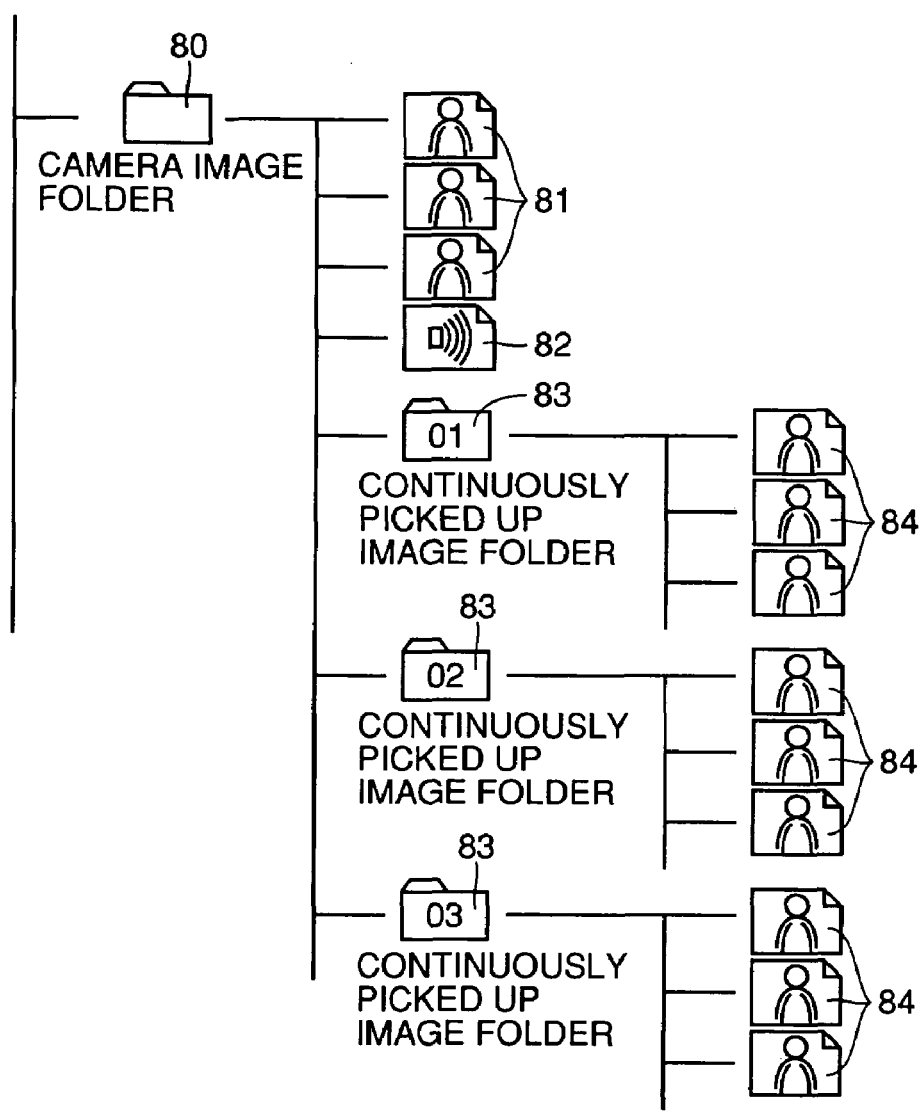
FIG. 17 is an illustration representing another example of improvement of the method of file management shown in FIG. 9.
Figure 18:
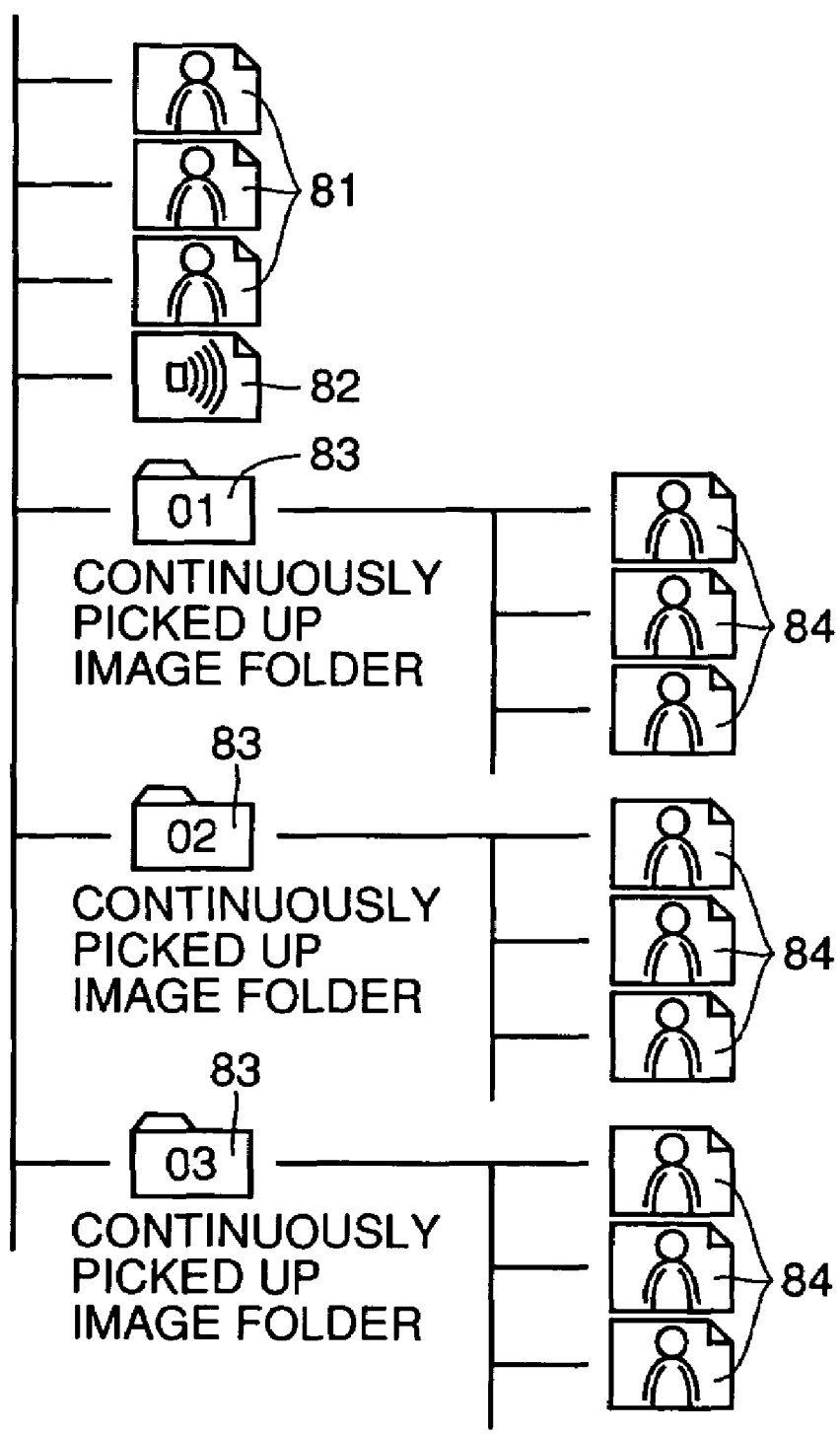
FIG. 18 is an illustration showing a still further improvement of the method of file management shown in FIG. 9.

Though motion image pickup mode is provided in the present embodiment, the present invention is similarly applicable to a digital camera not having the motion image pickup mode. In that case, motion image folder 85 and motion image files 86 are not formed as shown in FIG. 17. Further, there is no problem if camera image folder 80 is omitted, as shown in FIG. 18.

Figure 19:
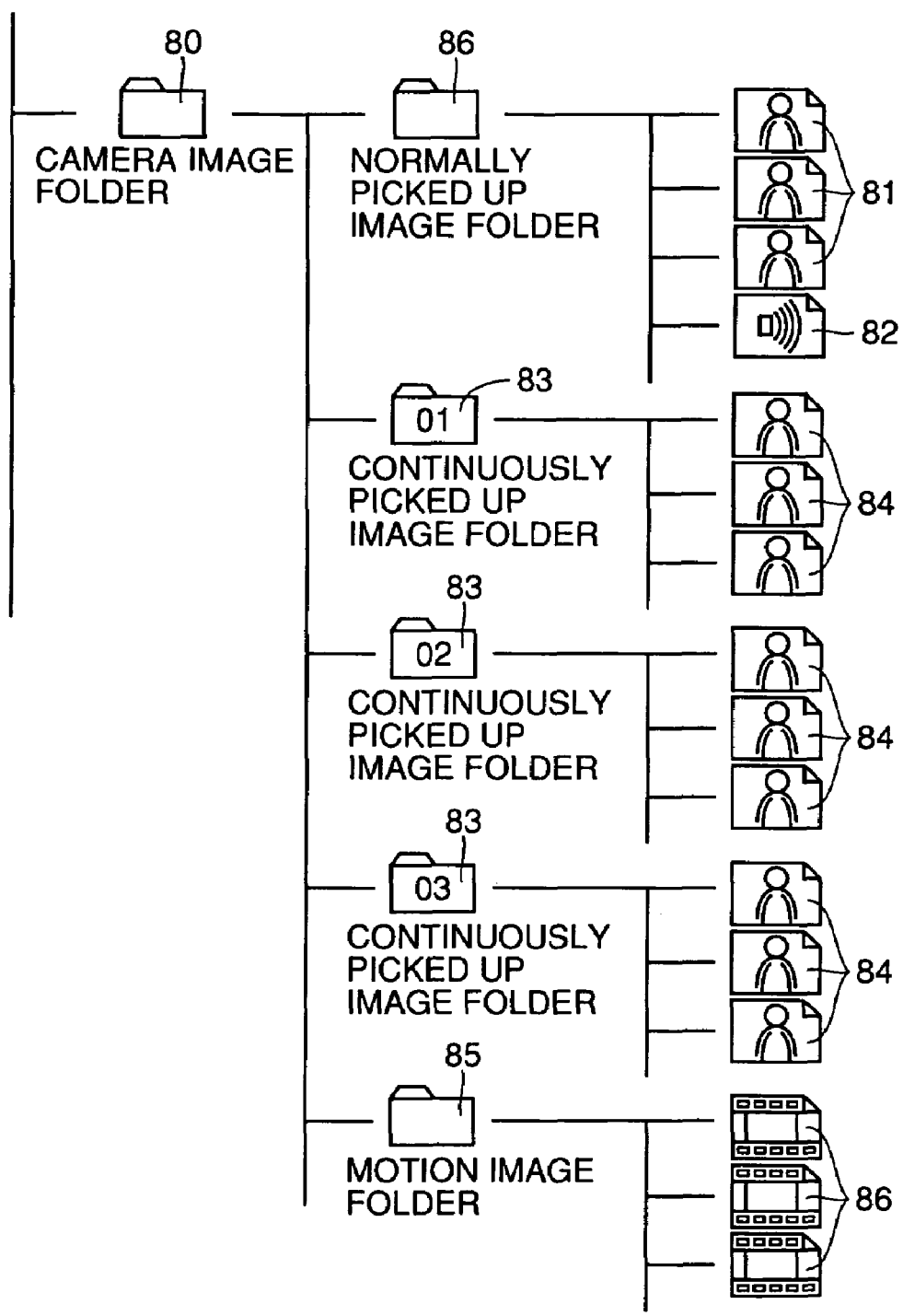
FIG. 19 is an illustration representing a method of file management of the digital camera in accordance with another embodiment of the present invention.

FIG. 19 is an illustration representing a method of file management of a digital camera in accordance with another embodiment of the present invention, which corresponds to FIG. 9.

In the embodiment shown in FIG. 9 described above, image data of still images picked up in the normal single still image pickup mode are stored as image file 81 in camera image folder 80, each of still images picked up in the continuous image pickup mode is stored as an image file 84 in continuously picked up image folder 83, and images picked up in the motion image pickup mode are stored as motion image files 86 in motion image folder 85.

By contrast, in the embodiment shown in FIG. 19, in order to store image data in flash memory 46, directories are formed and image data of a still image picked up in the normal single still image picked up is stored as an image file 81 in a normally picked up image folder 86 as one of the directories, data of voice input through microphone 14 utilizing a voice memory card are stored as voice file 82 in normally picked up image folder 86. Image file 84 of a still image is stored in a continuously picked up image folder 83 as another directory.

Figure 12:
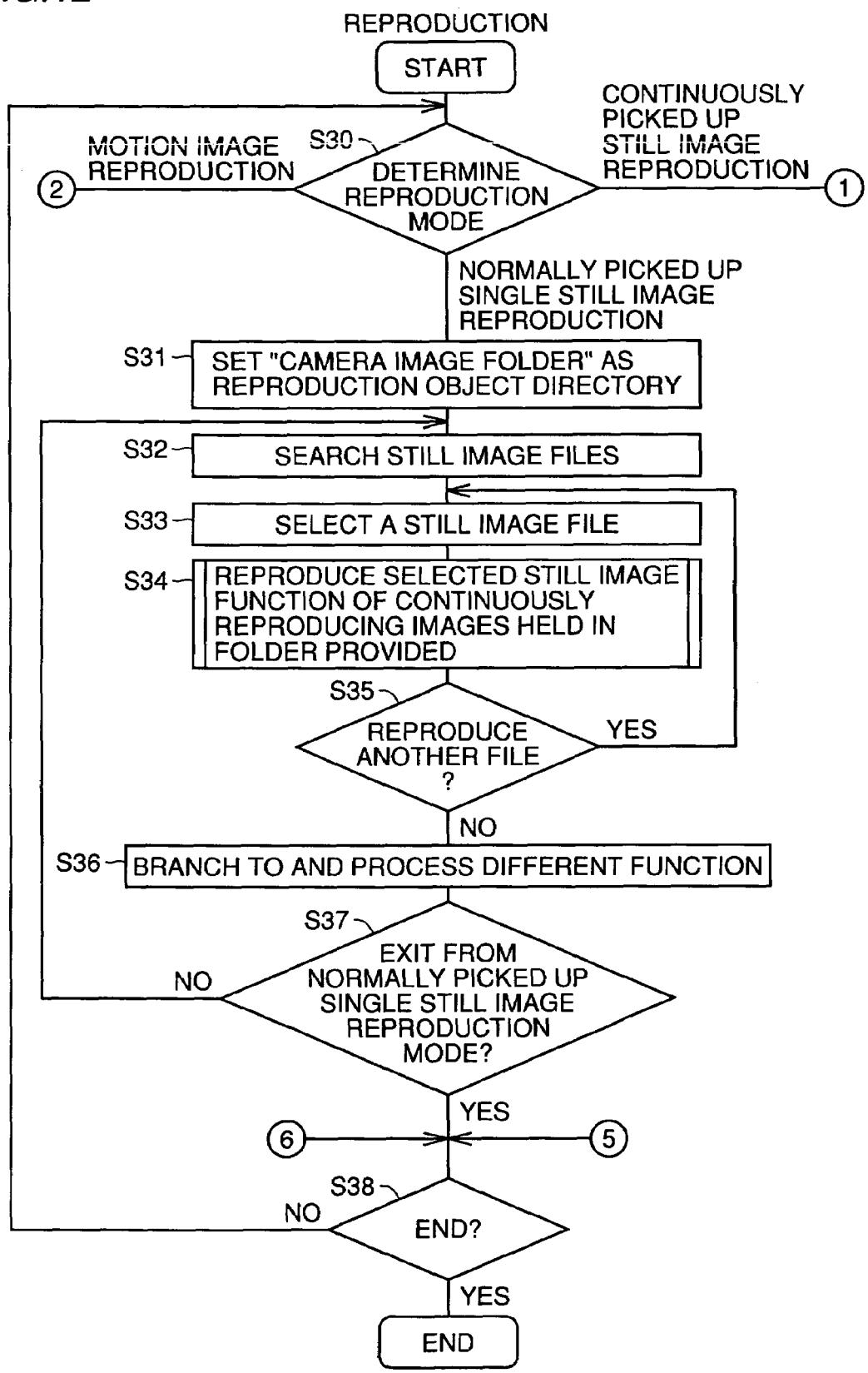
FIG. 12 represents a part related to normally picked up still image reproduction mode, of the flow chart representing the reproduction mode of the digital camera shown in FIGS. 1A and 1B.
Figure 20:
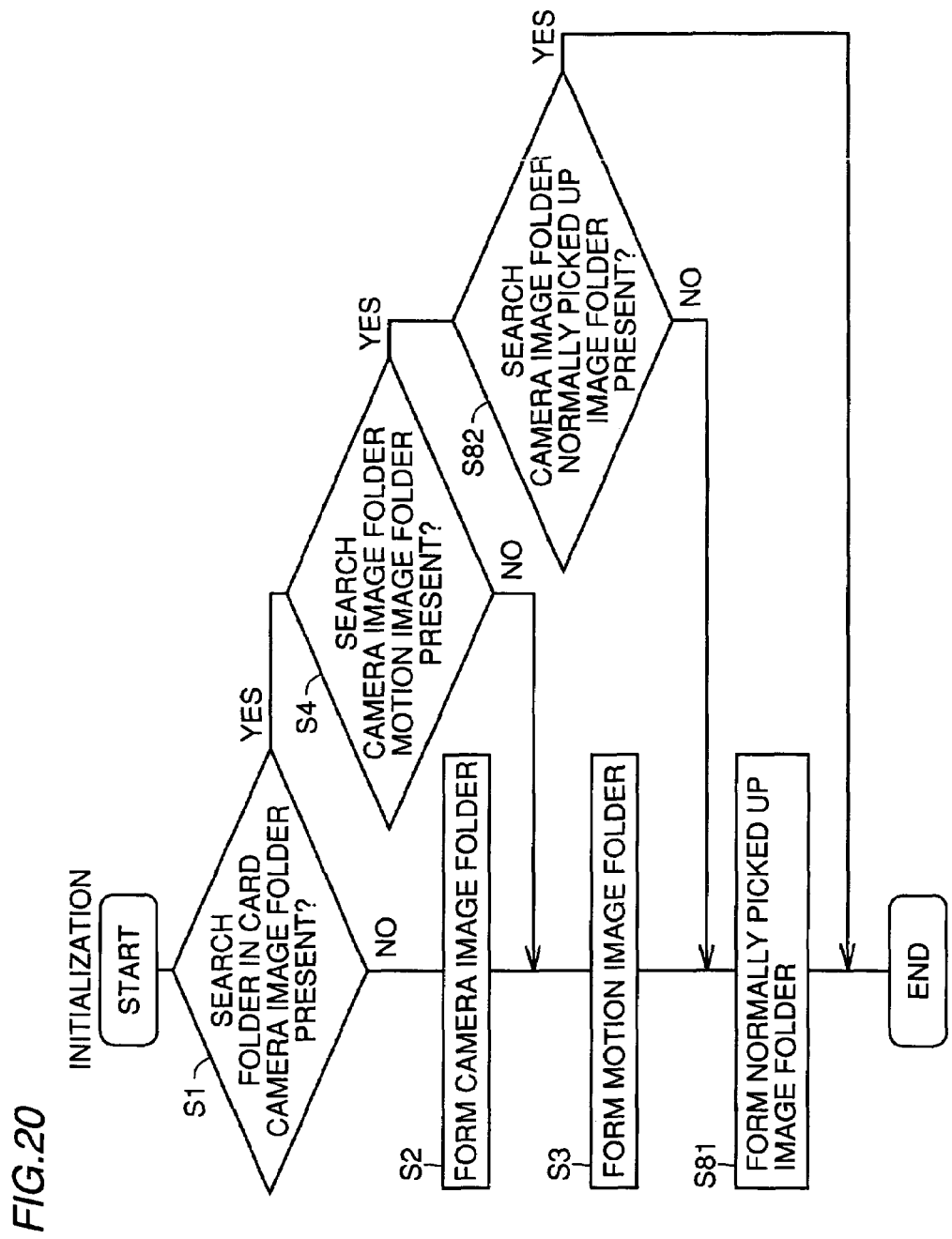
FIG. 20 is a flow chart representing a method of initialization of the digital camera in accordance with the embodiment shown in FIG. 19.
Figure 21:
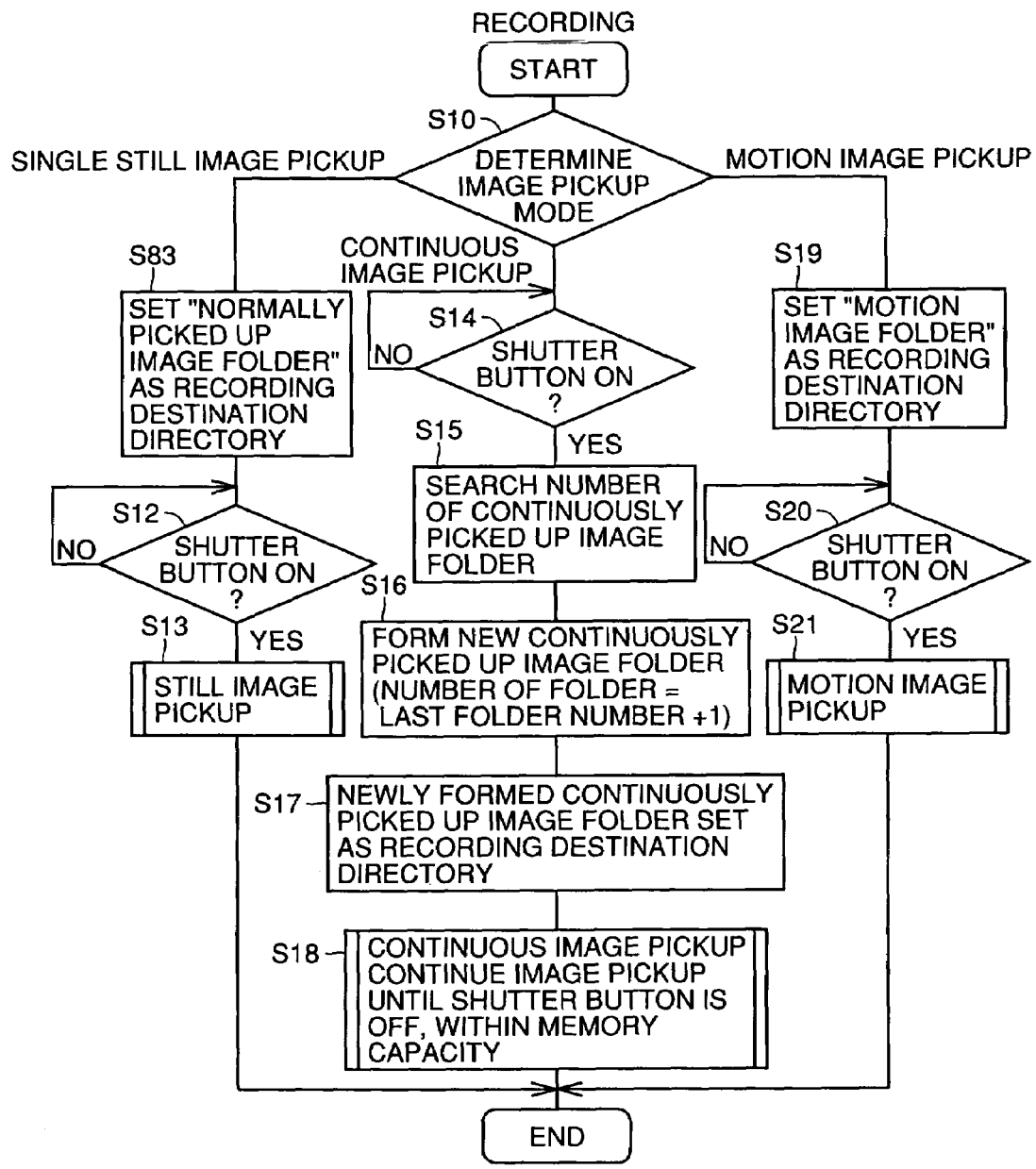
FIG. 21 is a flow chart representing a recording mode.
Figure 22:
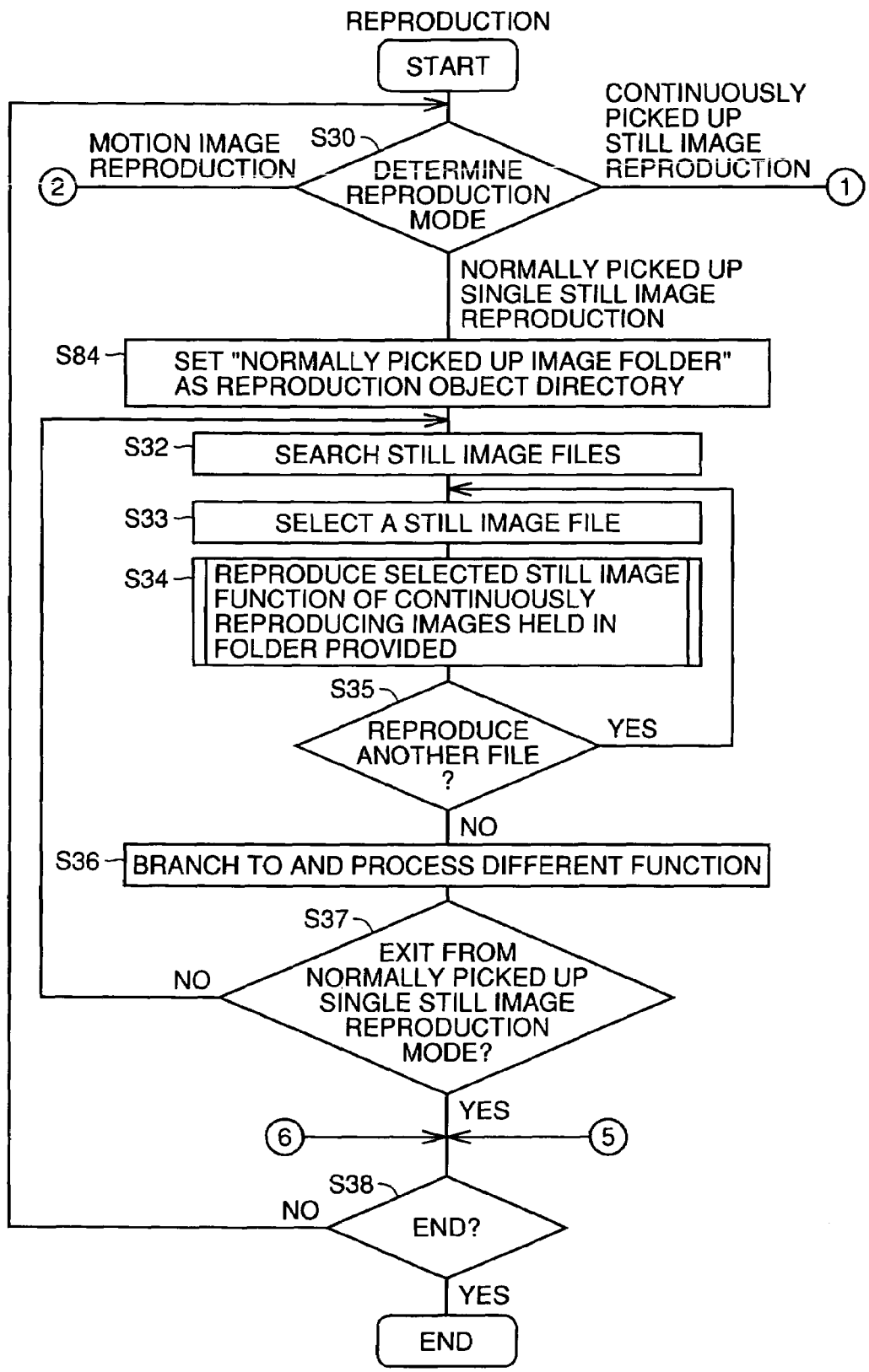
FIG. 22 is a flow chart representing a reproduction mode.

FIG. 20 is a flow chart representing a method of initialization of the digital camera in accordance with the embodiment shown in FIG. 19, FIG. 21 is a flow chart representing recording mode, and FIG. 22 is a flow chart representing a reproduction mode, which correspond to FIGS. 10, 11 and 12 of the above described first embodiment.

Referring to FIG. 20, in the method of initialization, similar to the method described with reference to FIG. 10, the process of steps S1 to S3 are performed. If camera image folder 80 is not formed, a camera image folder 80 and a motion image folder 85 are formed. In the present embodiment, after the motion image folder is formed in step S3, a normally picked up image folder 86 such as shown in FIG. 19 is formed in step S81.

If camera image folder 80 has been already formed in flash memory 46, the camera image folder 80 is searched in step S82, and a normally picked up image folder 86 is formed.

Referring to FIG. 21, the recording method will be described. Here, the method of recording in the continuous image pickup image mode and in the motion image pickup image mode are the same as those described with reference to FIG. 11. Therefore, description thereof is not repeated.

If the normal single still image pickup mode is determined in step S10, CPU 42 sets the normally picked up image folder 86 as the recording destination directory in step S83 and waits for pressing of shutter button 6 in step S12. When shutter button 6 is pressed, CPU 42 performs still image pickup in step S13, and ends recording. At this time, data of the picked up still image is stored as an image file 86 in the normally picked up image folder 86.

Referring to FIG. 22, an operation in the reproduction mode will be described. When single still image reproduction mode is set, CPU 42 sets the normally picked up image folder 86 as a reproduction object directory in step S84, and searches still image files 81 in step S32. Thereafter, CPU 42 selects a still image file 81 in accordance with an instruction from the operator, and reproduces the selected still image in step S34. At this time, when direction designating section 13*b* or 13*a* of direction designating button 13 is kept pressed for a prescribed time period (for example, 2 seconds), it is possible to continuously reproduce a plurality of still images held in normally picked up image folder 86 in the order of pickup or in the reverse order.

The steps S35 to S38 are the same as those described with reference to FIG. 12. Therefore, description thereof is not repeated.

Figure 14:
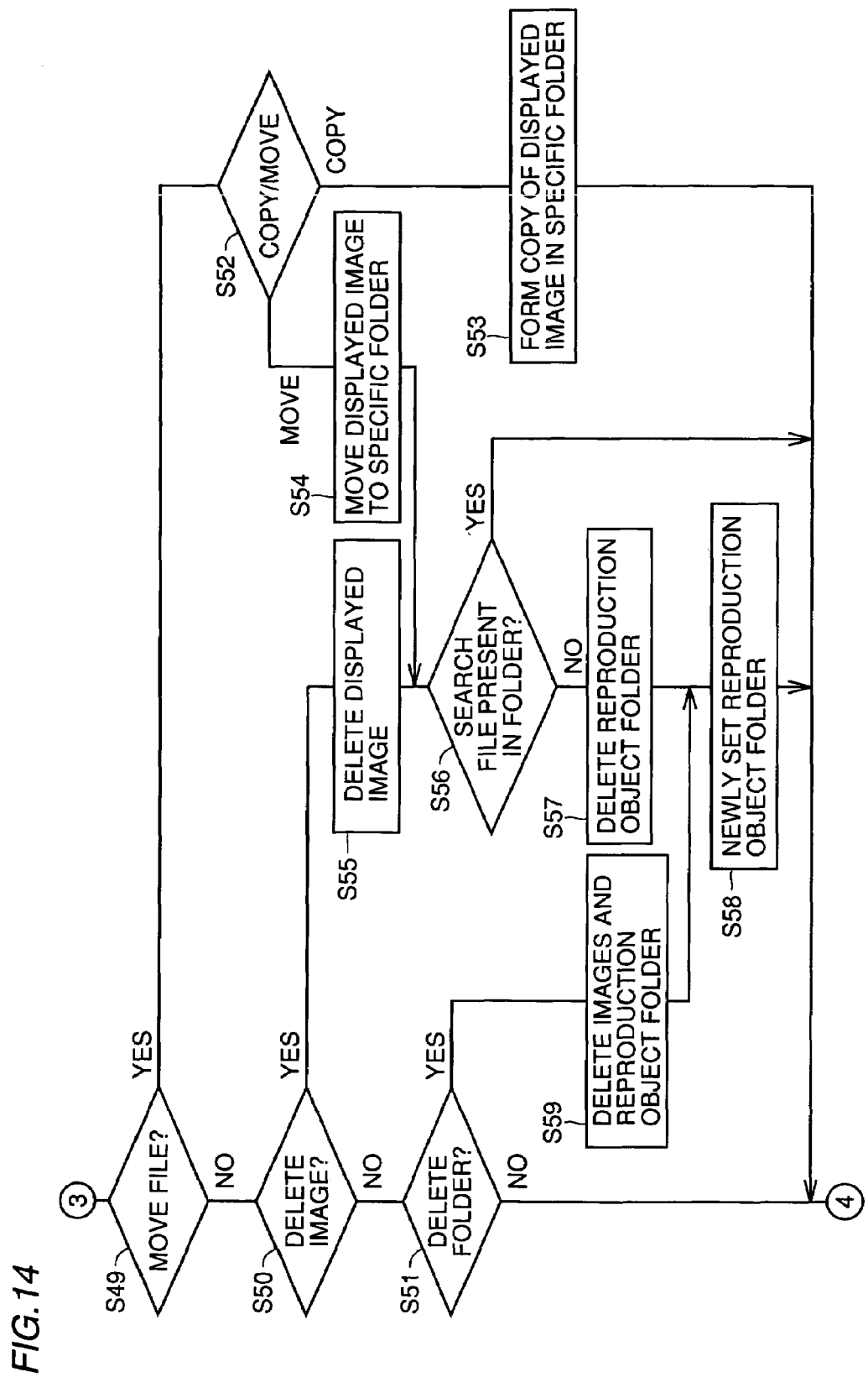
FIG. 14 is another flow chart representing a part related to the continuously picked up still image reproduction mode, of the flow chart representing the reproduction mode of the digital camera shown in FIGS. 1A and 1B.

When the continuously picked up still image reproduction mode is set, the process of FIG. 14 described above is performed, and when the motion image reproduction mode is set, the process of FIG. 15 is performed. As these processes have been described above, description thereof is not repeated.

Figure 23:
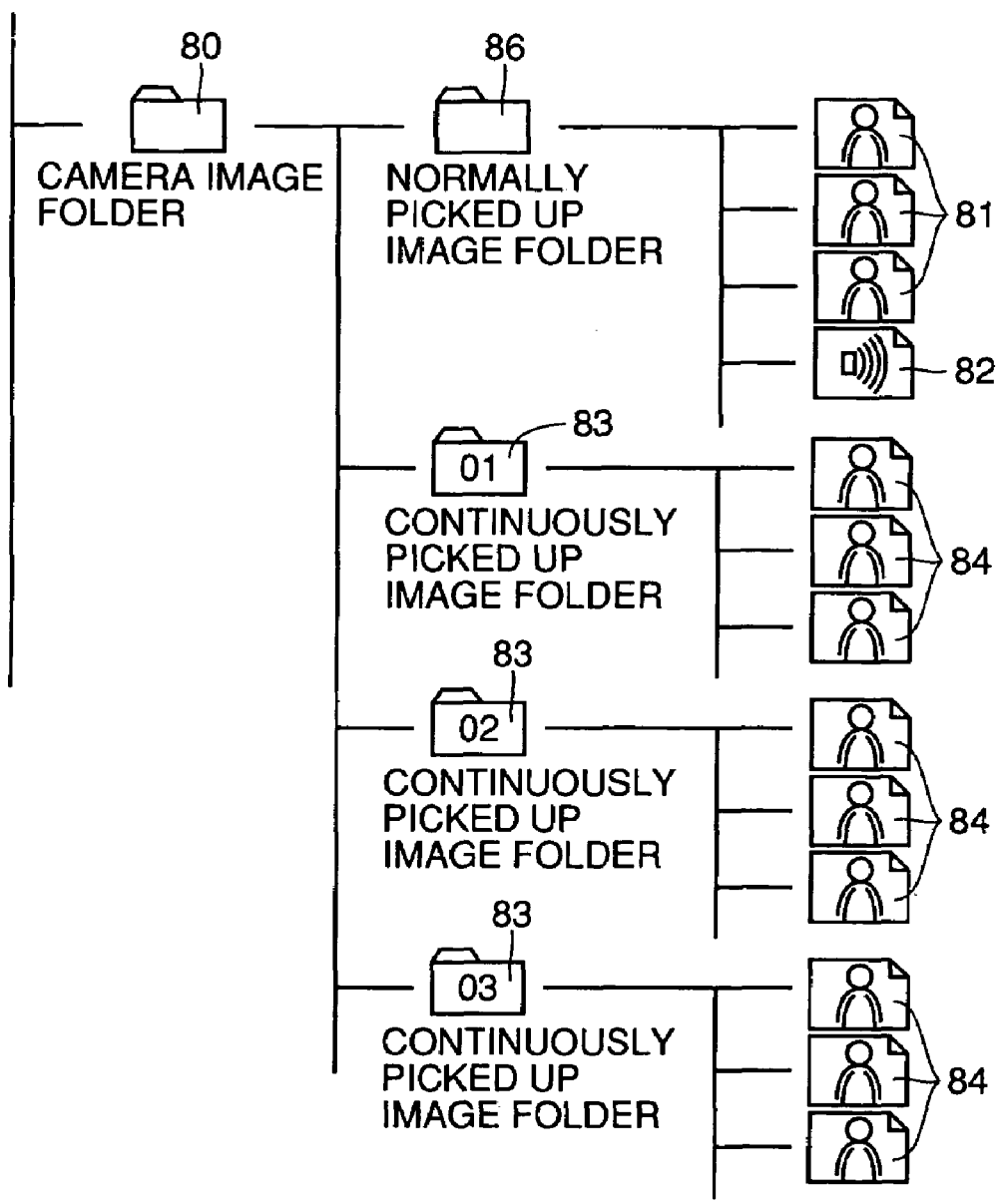
FIG. 23 is an illustration representing another example of the method of file management shown in FIG. 19.

FIG. 23 shows another example of the method of file management shown in FIG. 19, which corresponds to FIG. 17. In this example, the motion image folder 85 and motion image files 86 of FIG. 19 are omitted.

Figure 24:
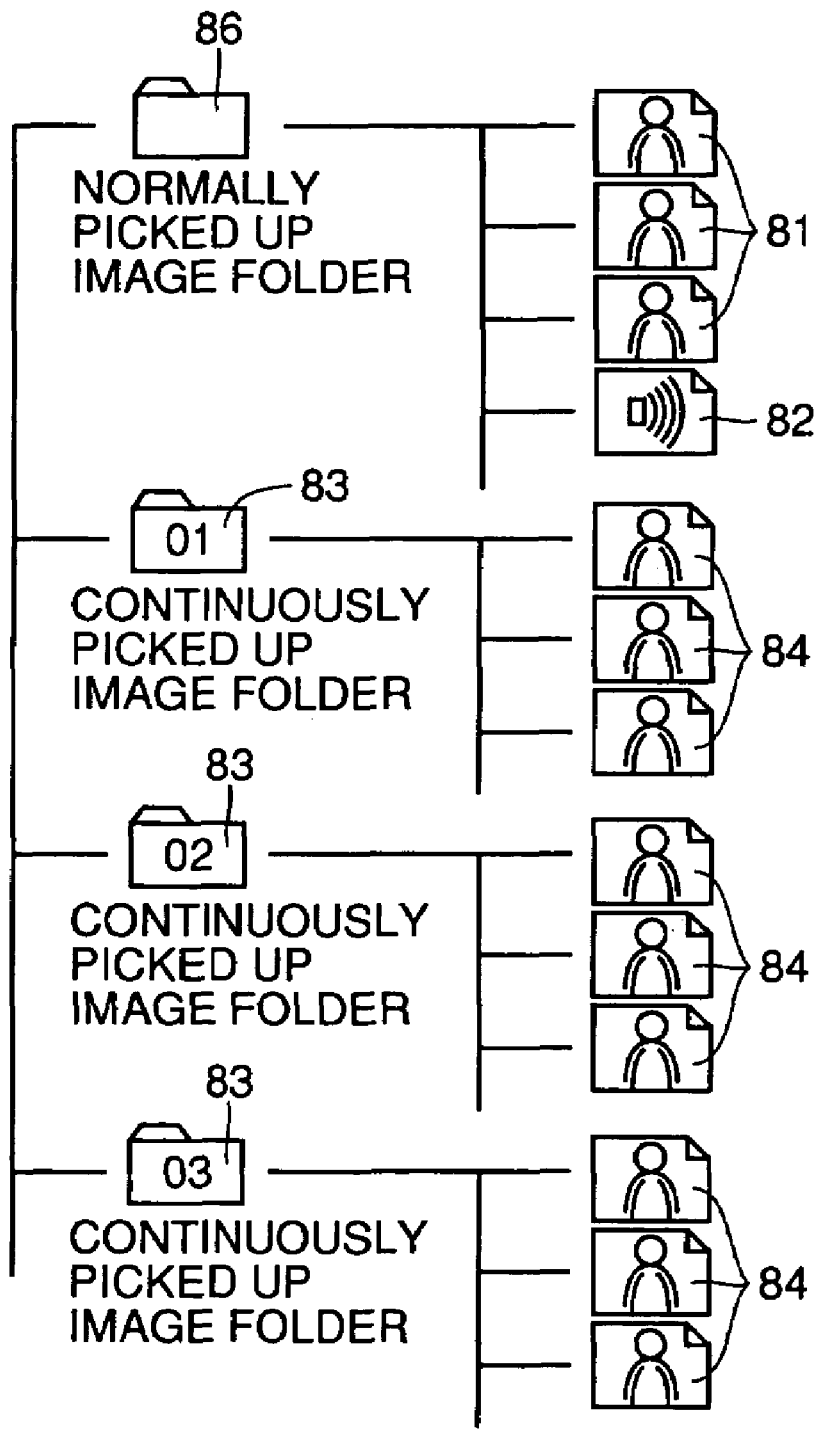
FIG. 24 is an illustration representing another example of the method of file management.

FIG. 24 shows a further example of the method of file management, in which camera image folder 80 is omitted.

Figure 25:
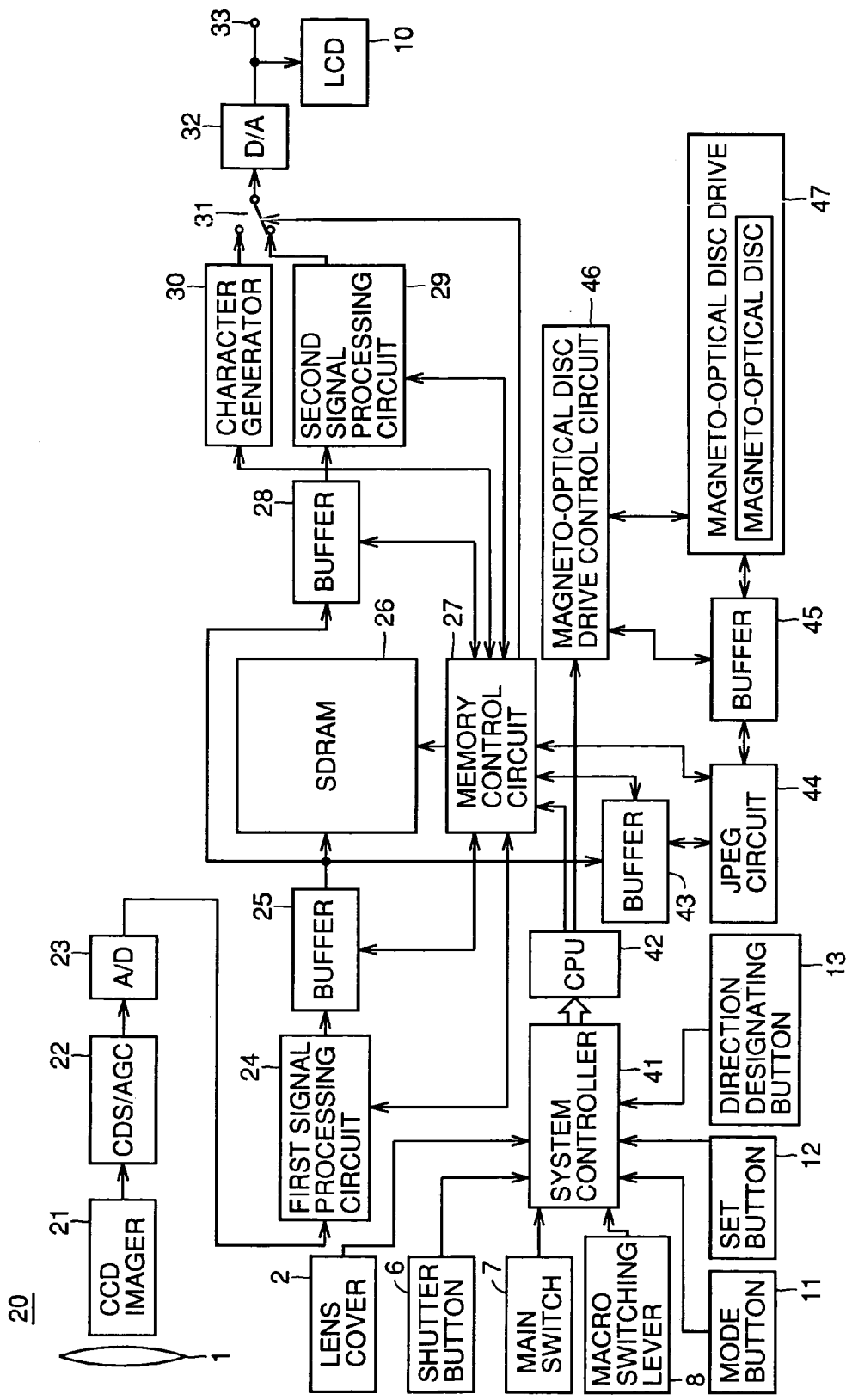
FIG. 25 is a block diagram representing another embodiment of the image recording and reproducing circuit contained in the digital camera.

FIG. 25 is a block diagram showing another embodiment of the image recording and reproducing circuit contained in the digital camera. In this embodiment, in place of flash memory 46 shown in FIG. 2, a magneto-optical disc drive 48 using as a recording medium a magneto-optical disc having large storage capacity is provided, and in place of flash memory control circuit 47, a magneto-optical disc drive control circuit 49 is provided. The use of the magneto-optical disc allows formation of a large number of various image folders.

As described above, in the embodiment shown in FIGS. 1 to 15, as the normally picked up image files and continuously picked up image folders belong to the same layer, when the number of normally picked up image files is large, selection of a continuously picked up image folder becomes difficult when the image files are transferred to a personal computer, as the continuously picked up image folders are displayed mixed with the large number of normally picked up image files by the browser software on the personal computer. By contrast, in the embodiment shown in FIGS. 19 to 24, the normally picked up image folder and the continuously picked up image folder belong to the same layer, and therefore selection of the continuously picked up image folder is facilitated. Further, as a magneto-optical disc or a hard disc having large capacity is used as the recording medium, the effect is more significant.

Further, in the present embodiment, the normally picked up image folder and the continuously picked up image folder belong to the same directory, and therefore the number of steps of control in accessing an image file is the same. Therefore, a program for selecting an object image of reproduction or deletion from image files on digital camera body or on a personal computer can be used both for the normally picked up images and the continuously picked up images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, having a normal image pickup mode in which images of an object are picked up one by one, a continuous image pickup mode in which images of an object are picked up continuously, a normally picked up image reproduction mode in which an image picked up in said normal image pickup mode is reproduced and a continuously picked up image reproduction mode in which an image picked up in said continuous image pickup mode is reproduced, comprising:

memory unit storing an image;

display unit for displaying an image;

first writing unit for storing each image picked up in said normal image pickup mode in said memory unit;

second writing unit classifying into groups and storing in said memory unit a plurality of images picked up in said continuous image pickup mode, session by session;

first selecting unit selecting, in said normally picked up image reproduction mode, a desired image among images stored in said memory unit;

second selecting unit selecting, in said continuously picked up image reproduction mode, a desired image group among image groups stored in said memory unit, and a desired image among a plurality of images belonging to the image group; and first reading unit taking out the image selected by said first and second selecting units from said memory unit and applying the image to said display unit, wherein said display unit does not simultaneously display both reduced images obtained from the normal pickup mode and the continuous image pickup mode on one screen, said second writing unit forms a reduced image of each image and stores the reduced image together with each image to said memory unit, said digital camera further comprising:

third selecting unit selecting, in said continuously picked up image reproduction mode, a predetermined number of reduced images among reduced images of predetermined images in respective image groups stored in said memory unit; and second reading unit for reading the prescribed number of reduced images selected by said third selecting unit from said memory unit, forming an image of one image plane from said predetermined number of reduced images, and applying the image to said display unit, wherein said first selecting unit has at least three direction designating sections for moving a state of display in at least three directions including a first direction, a second direction opposite the first direction and a third direction different from said first and second directions indicating a selected image to a single desired reduced image to be displayed among a plurality of reduced images displayed by said display unit, and wherein said second selecting unit selects said image group by selecting a single desired reduced image to be displayed from the predetermined number of reduced images displayed on said display unit.

2. The digital camera according to claim 1, having a continuous reproduction mode in which a plurality of images belonging to a selected image group are continuously reproduced, comprising:

third reading unit taking, in said continuous reproduction mode, a plurality of images belonging to the image group selected by said second selecting unit and continuously applying the images to said display unit.

3. The digital camera according to claim 1, having a moving mode for moving an image, comprising:

moving unit extracting, in said moving mode, an image selected by said second selecting unit from the image group to which the image belongs, and storing the extracted image to said memory unit of same directory as with an image picked up in said normal pickup mode.

4. The digital camera according to claim 1, having a copy mode for copying an image, comprising:

copying unit forming a copy image of an image selected by said second selecting unit and storing the copied image in said memory unit of the same directory as for an image picked up in said normal image pickup mode, in said copy mode.

5. The digital camera according to claim 1, having an image deletion mode for deleting an image, and an image group deletion mode for deleting an image group, comprising:

first deletion unit deleting, in said image deletion mode, the image selected by said first and second selecting units among images stored in said memory unit; and second deletion unit deleting, in said image group deletion mode, an image group selected by said second selecting unit, among image groups stored in said memory unit.

6. A digital camera, having a normal image pickup mode in which images of an object is picked up one by one, and a continuous image pickup mode in which images of an object are picked up continuously, comprising:

display unit displaying an image;

memory unit storing an image; and storing unit forming directories for storing files of picked up image data in said memory unit, storing each of the images picked up in said normal image pickup mode in one of said directories, and classifying into groups and storing a plurality of images picked up in said continuous image pickup mode, session by session of continuous image pickup, in another of the directories;

wherein said display unit does not simultaneously display both reduced images obtained from the normal pickup mode and the continuous image pickup mode on one screen;

said storing unit includes:

first writing unit writing each image picked up in said normal image pickup mode to one of said directories, and second writing unit writing a plurality of images picked up in said continuous image pickup mode, classified into groups session by session of continuous image pickup, in said another directory, said digital camera having a normally picked up image reproduction mode for reproducing an image picked up in the normal image pickup mode, and a continuously picked up image reproduction mode for reproducing an image picked up in said continuous image pickup mode, said digital camera further comprising:

first selecting unit selecting a desired image among images stored in said directory in said normally picked up image reproduction mode;

second selecting unit selecting a desired image group among image groups stored in said directory and a desired image among a plurality of images belonging to the image group, in said continuously picked up image reproduction mode; and first reading unit taking an image selected by said first and second selecting units from said directory and applying to said display unit;

said second writing unit forms a reduced image of each image and stores the reduced image together with each image in said directory;

said digital camera further comprising:

third selecting unit selecting a predetermined number of reduced images among reduced images of predetermined images in respective image groups stored in said directory, in said continuously picked up image reproduction mode; and second reading unit reading from said directory, a predetermined number of reduced images selected by said third selecting unit, forming an image of one image plane from said predetermined number of reduced images and applying to said display unit, wherein said first selecting unit has at least three direction designating sections for moving a state of display in at least three directions including a first direction, a second direction opposite the first direction and a third direction different from said first and second directions indicating a selected image to a single desired reduced image to be displayed among a plurality of reduced images displayed by said display unit, and wherein said second selecting unit selects said image group by selecting a single desired reduced image to be displayed from the predetermined number of reduced images displayed on said display unit.

7. The digital camera according to claim 6, having a continuous reproduction mode for continuously reproducing a plurality of images belonging to a selected image group, said digital camera further comprising:
   third reading unit taking a plurality of images belonging to the image group selected by said second selecting unit from said directory and continuously applying to said display unit in said continuous reproduction mode.

8. The digital camera according to claim 6, having a moving mode for moving an image, comprising:
   moving unit extracting the image selected by said second selecting unit from the image group to which the image belongs, and storing the image in the same directory as for the image picked up in said normal image pickup mode, in said moving mode.

9. The digital camera according to claim 6, having a copy mode for copying an image, comprising:
   copying unit forming a copy image of an image selected by said second selecting unit and storing image in the same said directory as with the image picked up in said normal image pickup mode, in said copy mode.

10. The digital camera according to claim 6, having an image deletion mode for deleting an image and an image group deletion mode for deleting an image group, comprising:
   first deleting unit deleting an image selected by said first and second selecting units among images stored in said directory, in said image deletion mode, and
   second deleting unit deleting the image group selected by said second selecting unit among image groups stored in said directory, in said image group deletion mode.

* * * * *